(12) United States Patent
Zhang et al.

(10) Patent No.: US 10,104,600 B2
(45) Date of Patent: Oct. 16, 2018

(54) ENHANCED ACTIVE SCANNING IN WIRELESS LOCAL AREA NETWORKS

(71) Applicant: InterDigital Patent Holdings, Inc., Wilmington, DE (US)

(72) Inventors: Guodong Zhang, Syosset, NY (US); Lei Wang, San Diego, CA (US); Xiaofei Wang, Cedar Grove, NJ (US); Joseph S. Levy, Merrick, NY (US); Robert L. Olesen, Huntington, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 15/632,897

(22) Filed: Jun. 26, 2017

(65) Prior Publication Data

US 2017/0295538 A1    Oct. 12, 2017

Related U.S. Application Data

(63) Continuation of application No. 15/354,775, filed on Nov. 17, 2016, now Pat. No. 9,763,178, which is a
(Continued)

(51) Int. Cl.
*H04W 48/16* (2009.01)
*H04W 72/04* (2009.01)
(Continued)

(52) U.S. Cl.
CPC ......... *H04W 48/16* (2013.01); *H04L 61/6022* (2013.01); *H04W 12/06* (2013.01);
(Continued)

(58) Field of Classification Search
CPC . H04W 48/16; H04W 72/0446; H04W 48/14; H04L 61/6022
See application file for complete search history.

(56) References Cited

U.S. PATENT DOCUMENTS 7,453,857 B2   11/2008  Mangold et al.
8,457,657 B2    6/2013  Agarwal et al.
(Continued)

FOREIGN PATENT DOCUMENTS

EP    2 320 706      5/2011
JP    2005-039632   2/2005
(Continued)

OTHER PUBLICATIONS

Abraham et al., "Text for access delay reduction for FILS," IEEE P802.11 Wireless LANs, IEEE 802.11-yy/xxxr0 (802.11-12/0124r1) (Mar. 3, 2012).
(Continued)

*Primary Examiner* — Mohammad S Anwar
(74) *Attorney, Agent, or Firm* — Volpe and Koenig, P.C.

(57) ABSTRACT

A method for active scanning in a wireless network may include two transmitters. In such a method, the following steps may take place: initiating active scanning on at least one of a plurality of channels; waiting to transmit a first probe request on a first channel of the plurality of channels based on a delay timer; receiving at the first STA, while the delay timer is not expired, a probe request from a second STA; and skipping the first probe request on the first channel of the plurality of channels based on information contained in the received probe request from the second STA.

24 Claims, 11 Drawing Sheets

Related U.S. Application Data continuation of application No. 14/718,580, filed on May 21, 2015, now Pat. No. 9,622,153, which is a continuation of application No. 13/789,316, filed on Mar. 7, 2013, now Pat. No. 9,042,324.

(60) Provisional application No. 61/642,275, filed on May 3, 2012, provisional application No. 61/668,285, filed on Jul. 5, 2012, provisional application No. 61/695,567, filed on Sep. 4, 2012, provisional application No. 61/749,064, filed on Jan. 4, 2013.

(51) Int. Cl.
| | | |
|---|---|---|
| *H04W 48/10* | (2009.01) | |
| *H04W 48/14* | (2009.01) | |
| *H04L 29/12* | (2006.01) | |
| *H04W 12/06* | (2009.01) | |
| *H04W 84/12* | (2009.01) | |
| *H04W 88/08* | (2009.01) | |

(52) U.S. Cl.
CPC ........... *H04W 48/10* (2013.01); *H04W 48/14* (2013.01); *H04W 72/04* (2013.01); *H04W 72/0446* (2013.01); *H05K 999/99* (2013.01); *H04W 84/12* (2013.01); *H04W 88/08* (2013.01)

(56) References Cited

U.S. PATENT DOCUMENTS

| | | | |
|---|---|---|---|
| 9,661,561 | B2 | 5/2017 | Shu |
| 2005/0047371 | A1 | 3/2005 | Bennett |
| 2005/0059353 | A1 | 3/2005 | Smith et al. |
| 2007/0263578 | A1 | 11/2007 | Nakaso et al. |
| 2008/0031208 | A1 | 2/2008 | Abhishek et al. |
| 2008/0144588 | A1 | 6/2008 | Mezer et al. |
| 2008/0247377 | A1 | 10/2008 | Van Horn et al. |
| 2008/0298333 | A1 | 12/2008 | Seok |
| 2010/0150116 | A1 | 6/2010 | Ji et al. |
| 2011/0183683 | A1 | 7/2011 | Das et al. |
| 2013/0109313 | A1* | 5/2013 | Kneckt ................. H04W 8/005 455/41.2 |
| 2013/0176955 | A1 | 7/2013 | Chueh et al. |
| 2013/0177002 | A1* | 7/2013 | Sun ....................... H04W 48/12 370/338 |
| 2015/0098358 | A1 | 4/2015 | Park et al. |
| 2015/0208444 | A1 | 7/2015 | Park et al. |
| 2015/0245283 | A1 | 8/2015 | Park et al. |

FOREIGN PATENT DOCUMENTS

| | | |
|---|---|---|
| JP | 2011-019104 A2 | 1/2009 |
| WO | 07/122992 | 11/2007 |
| WO | 11/090257 | 7/2011 |
| WO | 12/048251 | 4/2012 |

OTHER PUBLICATIONS

Hsieh et al., "Differentiate Transmissions of Probe Responses," IEEE 802.11-12/0246r3 (Mar. 15, 2012).
Park et al., "Step-wise Active Scanning in TGai," IEEE 802.11-12/0257 (Mar. 2012).
Abraham et al., "Text for access delay reduction for FILS," IEEE P802.11 Wireless LANs, IEEE 802.11-12/0124r1 (Dec. 2011).
Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 9: Interworking with External Networks, IEEE Std. 802.11u-2011 (Feb. 25, 2011).
Emmelmann, "TGai Requirements Document," IEEE P802.11 Wireless LANs, IEEE 802.11-11-0745r5 (May 2011).
Hsieh et al., "Differentiate Transmissions of Probe Responses," IEEE 802.11-12/0246r2 (Mar. 2012).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2012 (Mar. 29, 2012).
Kneckt et al., "Active Scanning Enabling FILS," IEEE P802.11 Wireless LANs, IEEE 802.11-11/1619r3 (Jan. 2012).
Lee et al., "TGai FILS Proposal," IEEE 802.11-11/1000r1 (Jul. 2011).
Mano et al., "IEEE 802.11 for High Speed Mobility," IEEE 802.11-09/1000r6 (Jan. 2010).
Park et al., "Step-wise Active Scanning in TGai," IEEE 802.11-12/0257r1 (Mar. 2012).
Yang et al., "Reducing Overhead in Active Scanning," IEEE 802.11-12/0791r3 (Jul. 2012).
Yunoki et al., "Hybrid Scanning," IEEE 11-12/0277r5 (May 2012).
Yunoki et al., "Real Air-time Occupation by Beacon and Probe," IEEE 11-11/1413r2 (Dec. 2012).
Ghosh et al., "Restricted Access Window Signaling for Uplink Channel Access," IEEE 802.11-12/0843r0 (Jul. 2012).

\* cited by examiner

ENHANCED ACTIVE SCANNING IN WIRELESS LOCAL AREA NETWORKS

CROSS REFERENCE TO RELATED APPLICATIONS

This application is a continuation of U.S. patent application Ser. No. 15/354,775 filed Nov. 17, 2016, which is a continuation of U.S. patent application Ser. No. 14/718,580 filed May 21, 2015, which issued as U.S. Pat. No. 9,622,153 on Apr. 11, 2017, which is a continuation of U.S. patent application Ser. No. 13/789,316 filed Mar. 7, 2013, which issued as U.S. Pat. No. 9,042,324 on May 26, 2015, which claims the benefit of U.S. Provisional Application Ser. No. 61/642,275 filed May 3, 2012, U.S. Provisional Application Ser. No. 61/668,285 filed Jul. 5, 2012, U.S. Provisional Application Ser. No. 61/696,567 filed Sep. 4, 2012, and U.S. Provisional Application Ser. No. 61/749,064 filed Jan. 4, 2013, the contents of which are hereby incorporated by reference herein.

BACKGROUND

In IEEE 802.11, there are factors that may adversely impact performance and user experience in several different scenarios. The length of time (for example, up to several seconds) required for IEEE 802.11 to establish an initial connection for a user's device may adversely affect user experience. For example, using interactive sessions (for example, a Skype video), a connection may not be able to be maintained when switching from another network, for example, third generation (3G) to WLAN. Another example where the link setup process may adversely impact performance is a requirement for supporting a large number of users simultaneously entering an extended service set (ESS) and securely providing the users' initial authentication.

SUMMARY

A method for active scanning in a wireless network may include two transmitters. In such a method, the following steps may take place: initiating active scanning on at least one of a plurality of channels; waiting to transmit a first probe request on a first channel of the plurality of channels based on a delay timer; receiving at the first STA, while the delay timer is not expired, a probe request from a second STA; and skipping the first probe request on the first channel of the plurality of channels based on information contained in the received probe request from the second STA.

The above method may further include, on a condition that a probe response destined for the second STA, transmitted by the AP in response to the probe request from the second STA is not detected at the first STA prior to an expiration of the delay timer, transmitting the first probe request on the first channel of the plurality of channels.

In another embodiment a first station (STA) is provided that is configured to perform active scanning for an IEEE 802.11 access point (AP). The first STA may include: a processor configured to initiate active scanning on at least one of a plurality of channels and to wait to transmit a first probe request on a first channel of the plurality of channels based on a delay timer; a receiver configured to receive, while the delay timer is not expired, a probe request from a second STA; and the processor further configured to skip the first probe request on the first channel of the plurality of channels based on information contained in the received probe request from the second STA.

The above first STA may be further configured to transmit the first probe request on the first channel of the plurality of channels on a condition that a probe response, transmitted by the AP, is not detected at the first STA prior to an expiration of the delay timer.

BRIEF DESCRIPTION OF THE DRAWINGS

A more detailed understanding may be had from the following description, given by way of example in conjunction with the accompanying drawings.

DETAILED DESCRIPTION

Introduction

In wireless communications and particularly in Institute for Electrical and Electronics Engineers (IEEE) 802.11 protocols, which are informally known as Wi-Fi, it is often required that network entities, such as access points (APs) be able to provide connectivity to a large number of users. Users typically scan a communications network when establishing connectivity. Scanning often results in straining network bandwidth and causing access collision and delay due to the exchange of probe requests and responses between users and the network.

In the method and apparatus an MLME-SCAN.request primitive with a ScanType indicating an active scan may be received and on a condition that a ProbeDelay timer is expired or that a PHYRxStart.indication primitive is received, a basic access procedure may be performed. In the method and apparatus, transmission of a Probe Request may be suspended or cancelled. The suspension of cancellation may be performed via primitives between a station management entity (SME) and a media access control (MAC) layer management entity (MLME), whereby an MLME-Scan-STOP.request primitive may indicate the suspension of active scanning for a current channel. Further in the method and apparatus, a probe request frame may be transmitted on the condition that a probe response frame is not decoded.

Figure 1A:
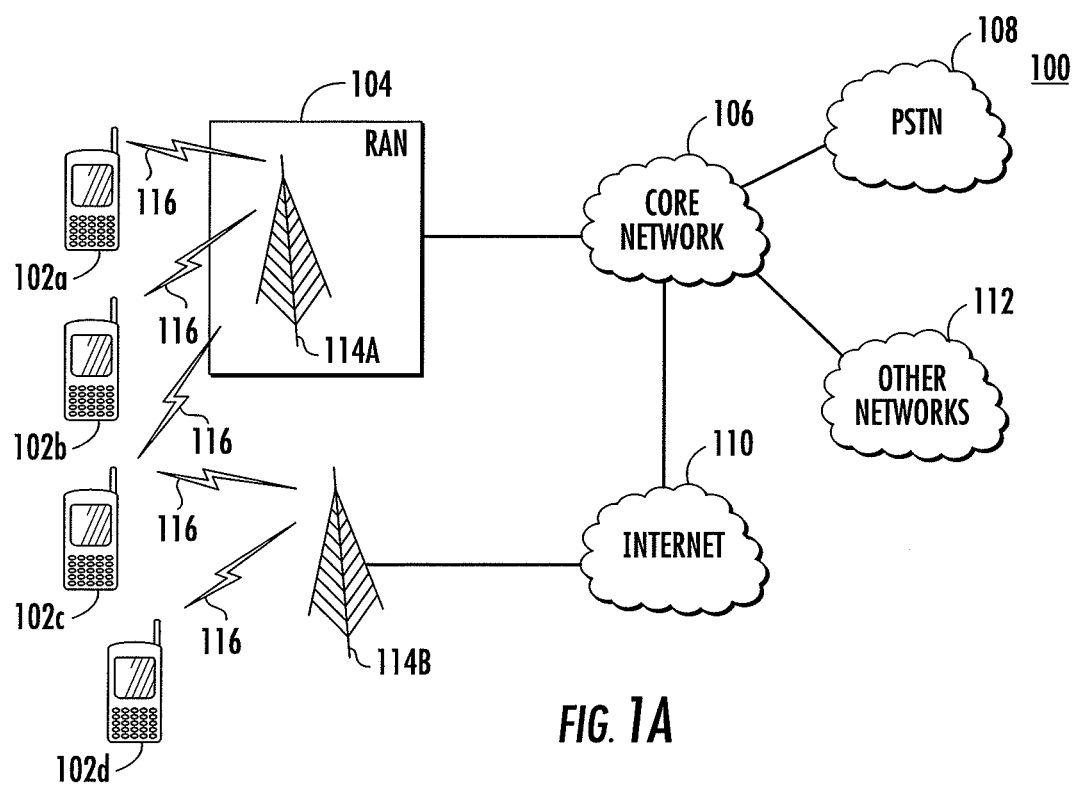
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
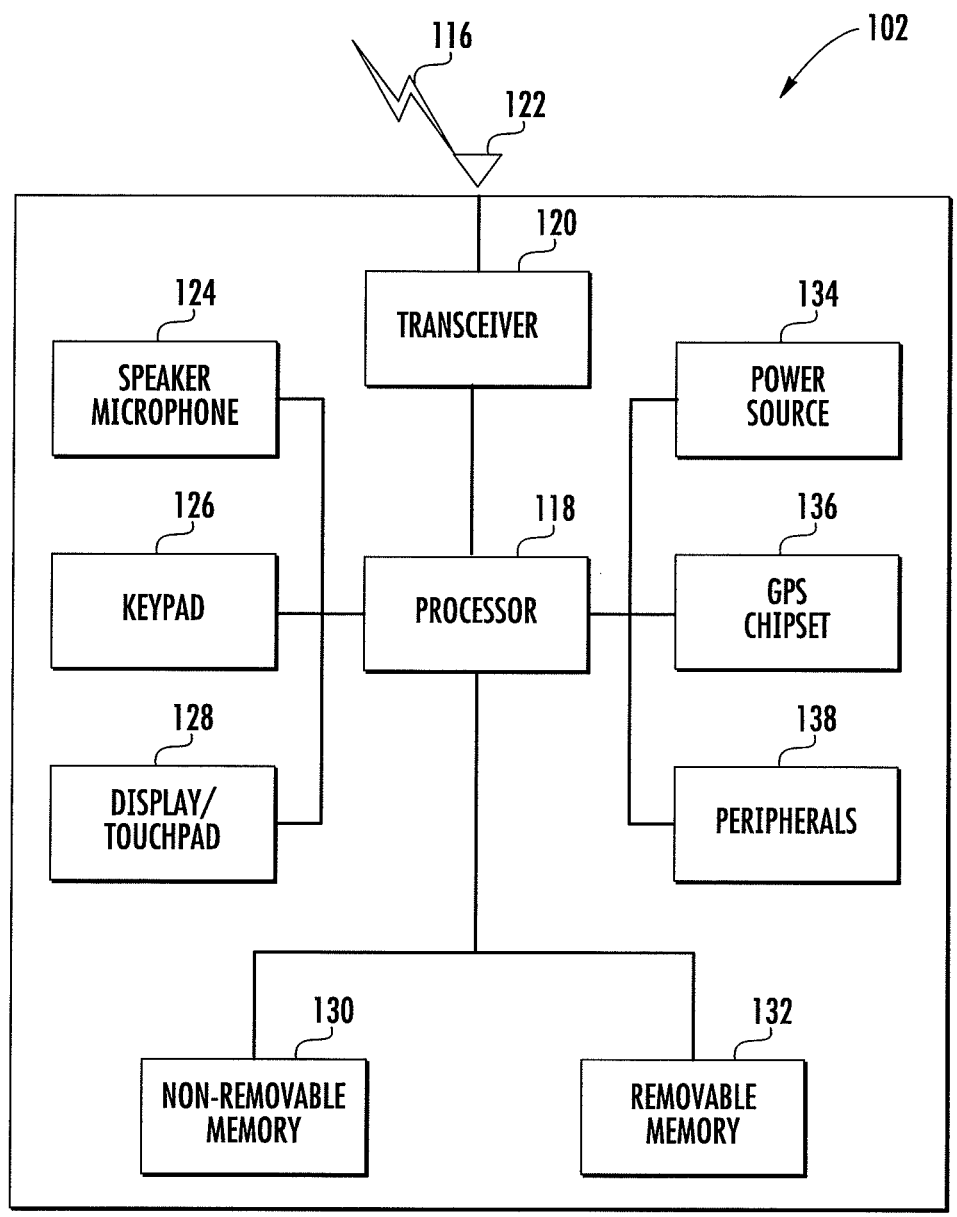
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
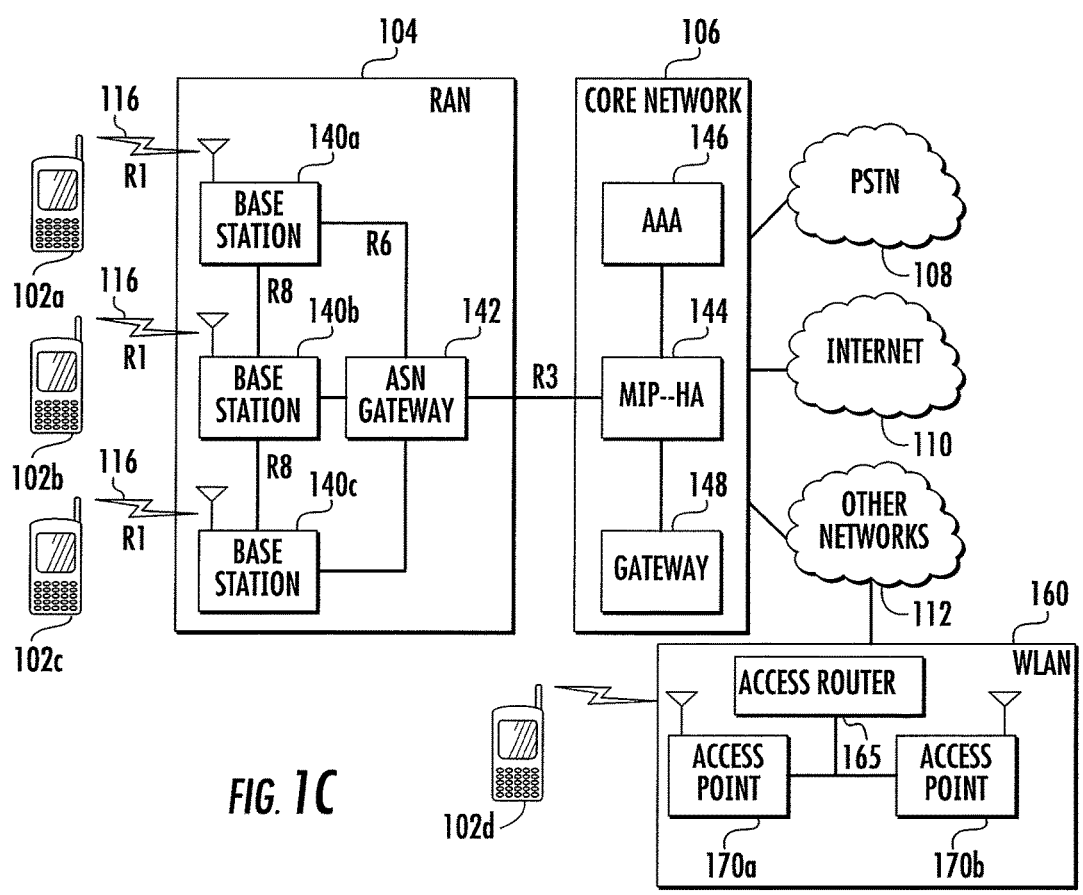
FIG. 1C is a system diagram of an example radio access network and an example core network that may be used within the communications system illustrated in FIG. 1A.

FIG. 1C is a system diagram of the RAN 104 and the core network 106 according to an embodiment. The RAN 104 may be an access service network (ASN) that employs IEEE 802.16 radio technology to communicate with the WTRUs 102a, 102b, 102c over the air interface 116. As will be further discussed below, the communication links between the different functional entities of the WTRUs 102a, 102b, 102c, the RAN 104, and the core network 106 may be defined as reference points.

As shown in FIG. 1C, the RAN 104 may include base stations 140a, 140b, 140c, and an ASN gateway 142, though it will be appreciated that the RAN 104 may include any number of base stations and ASN gateways while remaining consistent with an embodiment. The base stations 140a, 140b, 140c may each be associated with a particular cell (not shown) in the RAN 104 and may each include one or more transceivers for communicating with the WTRUs 102a, 102b, 102c over the air interface 116. In one embodiment, the base stations 140a, 140b, 140c may implement MIMO technology. Thus, the base station 140a, for example, may use multiple antennas to transmit wireless signals to, and receive wireless signals from, the WTRU 102a. The base stations 140a, 140b, 140c may also provide mobility management functions, such as handoff triggering, tunnel establishment, radio resource management, traffic classification, quality of service (QoS) policy enforcement, and the like. The ASN gateway 142 may serve as a traffic aggregation point and may be responsible for paging, caching of subscriber profiles, routing to the core network 106, and the like.

The air interface 116 between the WTRUs 102a, 102b, 102c and the RAN 104 may be defined as an R1 reference point that implements the IEEE 802.16 specification. In addition, each of the WTRUs 102a, 102b, 102c may establish a logical interface (not shown) with the core network 106. The logical interface between the WTRUs 102a, 102b, 102c and the core network 106 may be defined as an R2 reference point, which may be used for authentication, authorization, IP host configuration management, and/or mobility management.

The communication link between each of the base stations 140a, 140b, 140c may be defined as an R8 reference point that includes protocols for facilitating WTRU handovers and the transfer of data between base stations. The communication link between the base stations 140a, 140b, 140c and the ASN gateway 215 may be defined as an R6 reference point. The R6 reference point may include protocols for facilitating mobility management based on mobility events associated with each of the WTRUs 102a, 102b, 102c.

As shown in FIG. 1C, the RAN 104 may be connected to the core network 106. The communication link between the RAN 104 and the core network 106 may defined as an R3 reference point that includes protocols for facilitating data transfer and mobility management capabilities, for example. The core network 106 may include a mobile IP home agent (MIP-HA) 144, an authentication, authorization, accounting (AAA) server 146, and a gateway 148. While each of the foregoing elements are depicted as part of the core network 106, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 144 may provide the WTRUs 102a, 102b, 102c with access to packet-switched networks, such as the Internet 110, to facilitate communications between the WTRUs 102a, 102b, 102c and IP-enabled devices. The AAA server 146 may be responsible for user authentication and for supporting user services. The gateway 148 may facilitate interworking with other networks. For example, the gateway 148 may provide the WTRUs 102a, 102b, 102c with access to circuit-switched networks, such as the PSTN 108, to facilitate communications between the WTRUs 102a, 102b, 102c and traditional land-line communications devices. In addition, the gateway 148 may provide the WTRUs 102a, 102b, 102c with access to the networks 112, which may include other wired or wireless networks that are owned and/or operated by other service providers.

Although not shown in FIG. 1C, it will be appreciated that the RAN 104 may be connected to other ASNs and the core network 106 may be connected to other core networks. The communication link between the RAN 104 the other ASNs may be defined as an R4 reference point, which may include protocols for coordinating the mobility of the WTRUs 102a, 102b, 102c between the RAN 104 and the other ASNs. The communication link between the core network 106 and the other core networks may be defined as an R5 reference, which may include protocols for facilitating interworking between home core networks and visited core networks.

Other network 112 may further be connected to an IEEE 802.11 based wireless local area network (WLAN) 160. The WLAN 160 may include an access router 165. The access router may contain gateway functionality. The access router 165 may be in communication with a plurality of access points (APs) 170a, 170b. The communication between access router 165 and APs 170a, 170b may be via wired Ethernet (IEEE 802.3 standards), or any type of wireless communication protocol. AP 170a is in wireless communication over an air interface with WTRU 102d.

A wireless local area network (WLAN) in an infrastructure basic service set (BSS) mode may have an access point (AP) for the BSS and one or more stations (STAs) associated with the AP. The AP may have access or an interface to a distribution system (DS) or another type of wired or wireless network that carries traffic in and out of the BSS. Traffic to STAs that originate from outside the BSS arrives through the AP and is delivered to the STAs. Traffic originating from STAs to destinations outside the BSS is sent to the AP to be delivered to its respective destinations. Traffic between STAs within the BSS may also be sent through the AP where the source STA sends traffic to the AP and the AP delivers the traffic to the destination STA. The traffic between STAs within a BSS is peer-to-peer traffic. The peer-to-peer traffic may also be sent directly between the source and destination STAs with direct link setup (DLS) using an Institute for Electrical and Electronics Engineers (IEEE) 802.11e DLS or an IEEE 802.11z tunneled DLS (TDLS). A WLAN in Independent BSS mode has no AP, and STAs communicate directly with each other.

DESCRIPTION

An initial link setup process as well as Fast Initial Link Setup (FILS) will be described.

An initial link setup time of less than 100 millisecond (ms) while maintaining a Robust Security Network Association (RSNA) security level is one benchmark desired in IEEE 802.11 communications. The initial link setup time may be defined as the amount of time required to gain an ability to send Internet Protocol (IP) traffic with a valid IP address through an AP. Further, a minimum user load support of at least 100 non-AP STAs entering an ESS within 1 second, and successfully conducting a link set-up is one benchmark. In addition, a robustness in the presence of high background load to provide a link set-up for media loads of at least 50% is another benchmark.

A FILS process may comprise five phases: AP discovery, network discovery, additional timing synchronization function (TSF), authentication and association, and higher layer IP setup.

Figure 2:
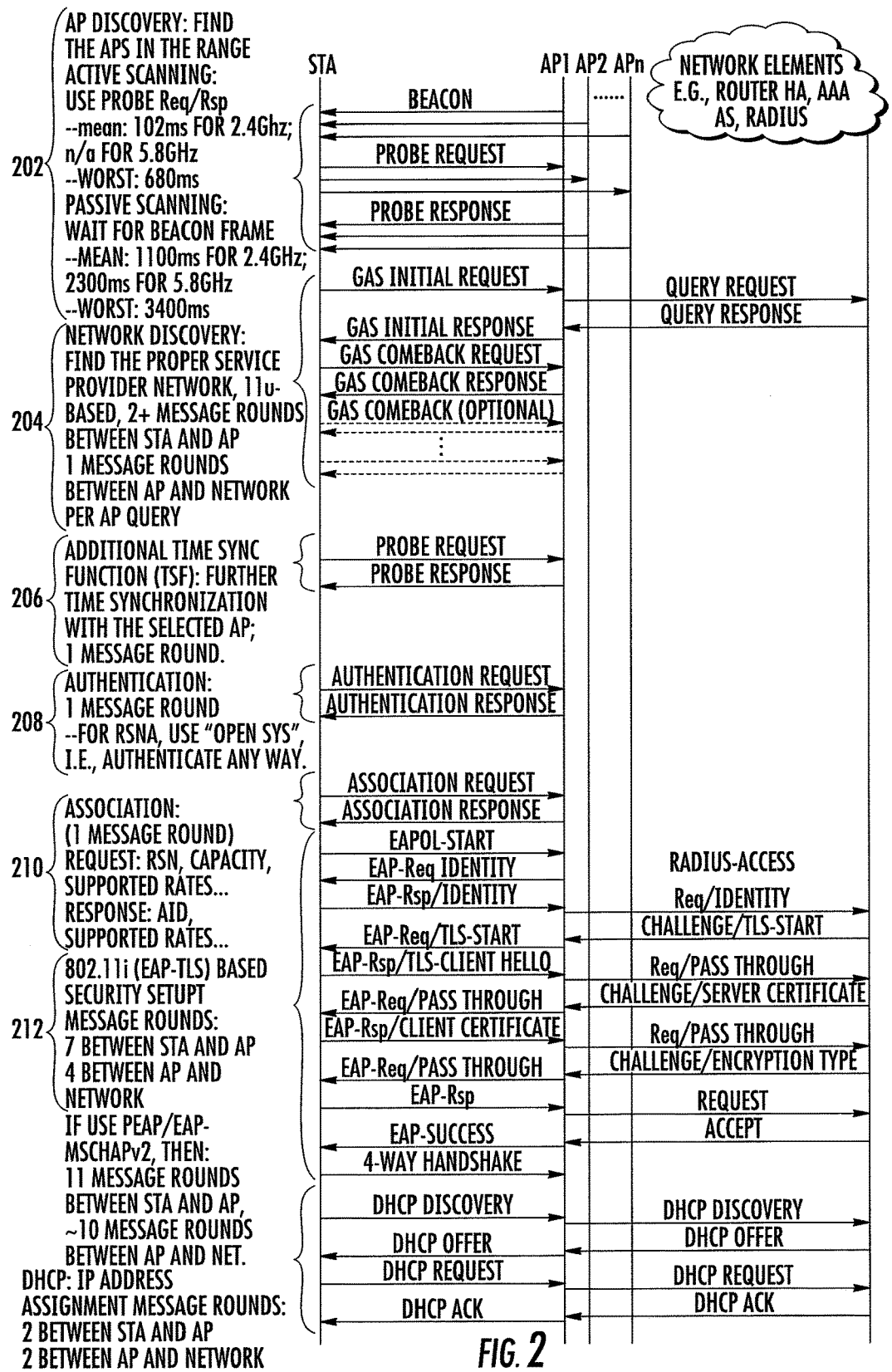
FIG. 2 shows an example of an IEEE 802.11 link setup procedure.

FIG. 2 shows an example of an IEEE 802.11 link setup. In FIG. 2, Extensible Authentication Protocol (EAP) is used. Shown in FIG. 2 are the five phases: AP discovery 202 which may be achieved using either active scanning or passive scanning by the STAs, network discovery 204, additional TSF 206, authentication 208 and associations 210, and higher layer IP setup 212.

The description will now describe active scanning and FILS in more detail.

There may be two types of scanning: active scanning and passive scanning. Active scanning and FILS are described herein. Passive scanning may be characterized as follows:

(1) A STA may not transmit any signal to an AP, (2) A STA tunes to each channel, for example, each channel on the candidate channel list and waits for the Beacon frames, and (3) All beacons received may be buffered to extract information about the BSS that sent the beacons.

In passive scanning there is a low overhead and the absence of frame exchanges. Additionally, there is potential slowness and scanning depends on the beacon interval.

Active scanning is characterized as follows:

(1) On each channel, a STA may send a Probe Request after gaining access, (2) The STA may wait for a Probe Response, and (3) A Probe Response may be a unicast management frame that needs to be acknowledged (ACKed).

In active scanning, there may be increased speed compared to a beacon as it is designed as one-on-one, and there is also high overhead and active scanning may not be designed for congested scenarios.

At the end of a scanning process, a scan report may be generated, which lists all discovered BSSs and their parameters. These parameters may be:

BSS identification (BSSID), Service Set ID (SSID), BSS type, beacon interval, timing parameters, physical layer (PHY) parameters, and the like. The STA may choose a BSS or AP to join according to a criterion.

The description will now describe enhanced active scanning.

Figure 3:
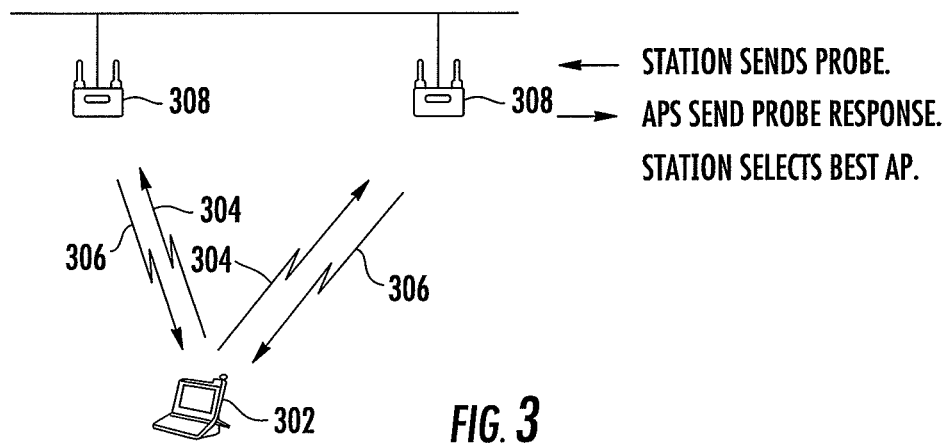
FIG. 3 shows an example of active scanning.

FIG. 3 shows an example of active scanning. A filter list may be added to Probe Request frames 304 to enable a requesting STA to define the APs that may respond more precisely. A transmitter 302 of the Probe Request frame 304 may indicate a Max Channel Time for which it may be available to receive Probe Response frames 306. The transmitter 302 of the Probe Request frame 304 may cancel the transmission of a pending Probe Response frames 306 by sending a Probe End frame to the AP(s), thus avoiding unnecessary retransmissions of probe responses if the transmitter of the Probe Request frame switches to scan another channel.

A Probe Response 306 may be transmitted to a broadcast address and a Probe Response frame may contain information from other BSSs. If an AP 308 overhears a Probe Response 306 including information from its BSS, the AP may cancel the transmission of its Probe Response frame. If an AP 308 receives multiple Probe Request frames 304, the AP 308 may transmit one Probe Response frame 306 as a response to the multiple requests. Similarly a beacon may be used as a probe response, thus eliminating duplicate transmission of the same information. Additionally, Probe Response frames may include information regarding BSSs whose primary channel is other than the scanned channel so that the number of channels to be scanned may be reduced.

The description will now describe active scanning parameters.

Active scanning will now be described. A primitive, referred to herein as an MLME-SCAN-STOP.request, will also be described herein. The MLME-SCAN-STOP.request primitive parameters are as follows: MLME-SCAN-STOP.request (ScanStopType, BSSID, SSID, SSIDList, HESSID, Mesh ID, Filter List, VendorSpecificInfo). Table 1 shows the type, valid range, and description of the parameters of the MLME-SCAN-STOP.request primitive.

TABLE 1

Type, valid range, and description of the parameters of the MLME-SCAN-STOP.request primitive.

| Name | Type | Valid range | Description |
| --- | --- | --- | --- |
| ScanStopType | Enumeration | STOP_ALL, SET_CRITERIA | Determines whether the reception of all probe responses are cancelled or if new criteria to respond are set. |
| BSSID | MACAddress | Any valid individual or broadcast MAC address | Identifies a specific or wildcard BSSID. |
| SSID | Octet string | 0-32 octets | Specifies the desired SSID or the wildcard SSID. |
| SSID List | A set of SSID Element | Previously defined | One or more SSID elements that may be present when dot11MgmtOptionSSIDListActivated is true. |
| HESSID | MAC | Any valid | Specifies the desired specific |

TABLE 1-continued

Type, valid range, and description of the parameters of the MLME-SCAN-STOP.request primitive.

| Name | Type | Valid range | Description |
|---|---|---|---|
| | Address | individual MAC address or the broadcast MAC address | HESSID network identifier or the wildcard network identifier. This field is present when dot11InterworkingServiceActivated is true. |
| Mesh ID | Octet string | 0-32 octets | Only present if BSSType = MESH or BSSType = ANY_BSS. Specifies the desired Mesh ID or wildcard Mesh ID. |
| Filter List | Previously defined | Previously defined | The list specifies the HESSIDs, Mesh IDs, SSIDs and BSSIDs that are not allowed to respond to the request. |
| VendorSpecific Info | A set of elements | Previously defined | Zero or more elements. |

The MLME-SCAN-STOP.request primitive may be generated by an SME for a STA to stop any ongoing scan process or to set new criteria for an ongoing scan process.

The effect of receipt of the MLME-SCAN-STOP.request primitive may be to terminate any ongoing scan procedures and transmit a probe end frame. The confirmation of the scan termination may be provided through an MLME-SCAN-.confirm primitive.

A field, referred herein as a "Filter List," may be added in an MLME-Scan.request primitive. The list specifies the HESSIDs, Mesh IDs, SSIDs and BSSIDs that may ignore the request.

Upon receipt of a MLME-SCAN.request primitive with a ScanType indicating an active scan, a STA may perform the following for each channel to be scanned:

a) Wait until a ProbeDelay time has expired or a PHY-RxStart.indication primitive has been received.

b) Perform a Basic Access procedure.

c) Send a probe request to the broadcast destination address with the SSID and BSSID from the MLME-SCAN-.request primitive. When the SSID List is present in the MLME-SCAN.request primitive send one or more Probe Request frames, each with an SSID indicated in the SSID List and the BSSID from the MLME-SCAN.request primitive.

d) Set a ProbeTimer to 0 and start the ProbeTimer.

e) If PHY-CCA.indication (busy) primitive has not been detected before the ProbeTimer reaches a MinChannelTime- set NAV to 0 and scan the next channel. Else, the MLME may issue a MLME-SCAN.received primitive with the BSSDescriptionSet containing information of the AP when Probe Response or Beacon frame is received from the AP for the first time. When ProbeTimer reaches MaxChannelTime set NAV to 0 and scan the next channel.

When all channels in the ChannelList have been scanned, the MLME may issue an MLME-SCAN.received primitive with the BSSDescriptionSet containing all the information gathered during the scan. If the MLME receives an MLME-SCAN-STOP.request primitive, the STA may transmit the Probe End frame with Terminate All Requests field of the FILS Request Parameters set to 1 and stop the ongoing scanning process. The MLME may issue an MLME-SCAN-.confirm primitive with the BSSDescriptionSet containing the gathered information and having the ResultCode set to SCAN_ABORTED.

The description will now describe canceling responses to probe requests and probe end frame.

Cancelling responses to Probe Request with Probe End will now be described herein. A generator of the Probe Request frame may transmit a Probe End frame to a broadcast address or an individual address. If a STA that has received the Probe End frame has not started transmitting or is transmitting a Probe Response frame to the transmitter of the Probe End frame, a response to Probe Request frame may be transmitted on a condition that the following criteria are met:

a) The Terminate All Requests field of the BSS Type element in the Filter List of the Probe End frame is set to 0.

b) The STA is an AP STA and the Infrastructure field of the BSS Type element in the Filter List of the Probe End frame is set to 0 or an SSID, an BSSID, or a homogeneous ESS identifier (HESSID) of the STA is not included in a Filter List of the Probe End frame; or 1) The BSS of STA is independent BSS (IBSS) and the IBSS field of the BSS Type element in the Filter List of the Probe End frame is set to 0 or the SSID or the BSSID of the STA is not included in a Filter List of the Probe End frame; or 2) The STA is a mesh STA and the mesh BSS (MBSS) field of the BSS Type element in the Filter List of the Probe End frame is set to 0 or the Mesh ID or the MAC Address of the mesh STA is not included in a Filter List of the Probe End frame.

If the above criteria are not met, the receiver of Probe End frame may transmit or retransmit a response to Probe Request frame once, but it may be a requirement that the response may not be transmitted or retransmitted more than once.

The description will now describe a simplified probe response.

In a simplified probe response, an AP may send a regular Probe Response frame in response to a Probe Request sent by a STA, (e.g., STA1). In response to a Probe Request (whether the response simplified or not) from another STA (e.g. STA2), the AP may send a simplified Probe Response to STA2, by having a reference to the regular Probe Response sent earlier. This may occur as long as the AP knows that STA2 is listening to the regular Probe Response. For example, the AP may receive the Probe Request from STA2 immediately before it sends out the regular Probe Response or the second Probe Request is a simplified Probe Request that references to the first Probe Request, indicating that STA2 is required be awaken and listening to a channel since it receives the first Probe Request.

The simplified Probe Response may include a Probe Response Reference Field or IE that copies the Sequence Control number in the Probe Response that is sent earlier as the reference information, for example. The target recipient or recipients of the Simplified Probe Response may use the reference information to uniquely identify the referenced Probe Response, which was received earlier.

The description will now describe differentiated initial link setup.

Figure 3A:
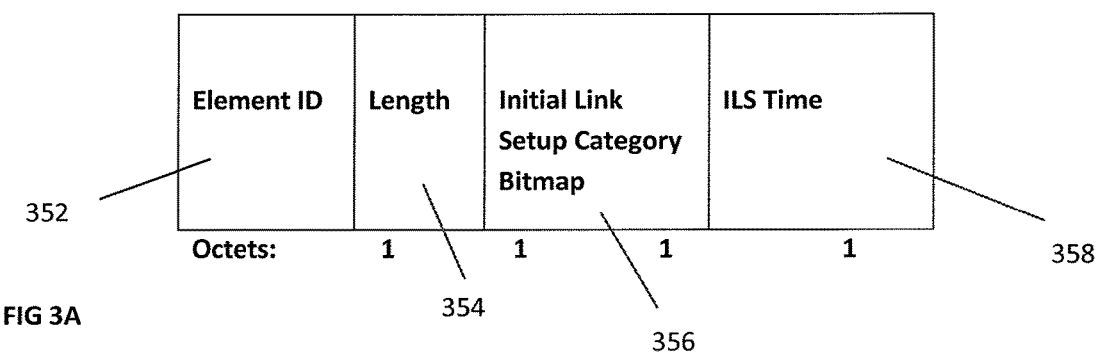
FIG. 3A shows an initial link setup element.

In differentiated Initial Link Setup:
The AP may include an Initial Link Setup (ILS) element as shown in FIG. 3A in frames such as beacons, FILS Discovery frames, and Probe Responses, with the following fields in addition to element ID 352 and Length 354.

Initial Link Setup Category (ILSC) Bitmap 356: a bitmap containing 8 ILSC bits indicating which ILS Category or Categories of STAs may attempt to associate with the AP in the following period.

ILS Time 358: an indication a period time during which the STAs for which ILSC bits set to 0 may not be allowed to attempt to associate with the AP.

The description will now describe several scenarios that might be encountered in use.

In a first scenario, when a large number of STAs that are seeking initial link setup enter a BSS simultaneously, the STAs conducting active scanning may send Probe Request frames to the AP. For example, based on real traffic measurements in a Tokyo train station, the number of Probe Response packets is about four to five times more than the number of Probe Request packets, which indicates that each Probe Request packet triggers 4 to 5 Probe Response packets on average. This is a result of using Probe Request frames with Wildcard SSID. Further, air time occupancy by Probe Request/Response packets takes about 18.32%. In addition, the number of Probe Request/Response packets is about 35% of the total packets, which increases the probability of channel access collision and delay, hence resulting in latency for active scanning of AP. It is therefore desirable to avoid unnecessary transmissions of Probe Request frames sent by the STAs seeking initial link setup. In addition, minimizing the transmissions of a Probe Request with Wildcard SSID is also desired.

In a second scenario, a STA that successfully receives a response to its transmitted Probe Request frame may send Probe Request End frames to APs to cancel any pending transmission of responses to a Probe Request. However the STA may not have knowledge of whether the scanning of other STAs on the channel is successful or not, (i.e, whether a Probe Response or Beacon is received or not). Examples are available that show that the cancellation of probe response frames may cause problems for other STAs seeking initial link setup.

Figure 4:
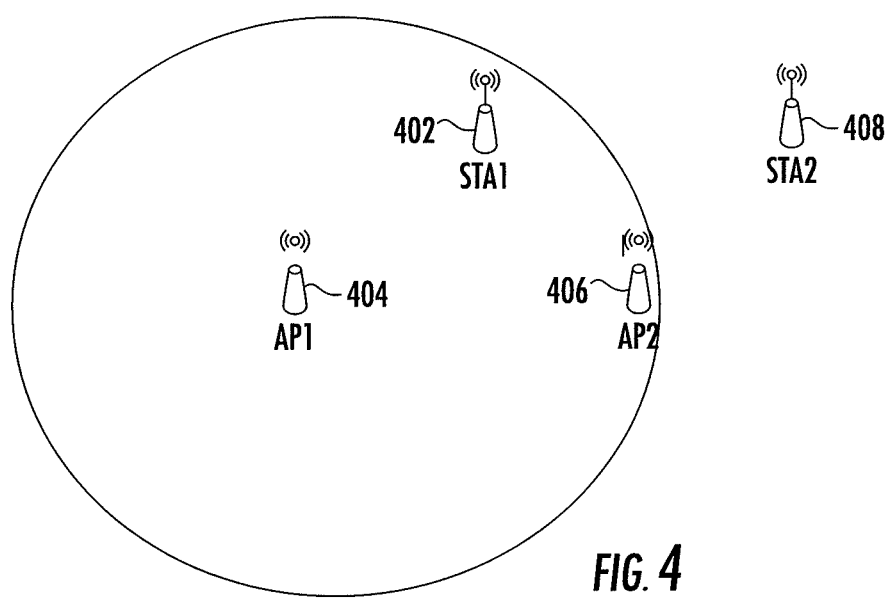
FIG. 4 shows an example of station and access point ranges.

FIG. 4 shows an example of station and access point ranges. For example, consider a scenario where STA1 402 is able to hear AP1/BSS1 404 and AP2/BSS2 406, but STA2 408 is not able to hear AP1/BSS1 404 but can hear AP2/BSS2 406. Further, STA1 402 sends a Probe Request that is received by AP1 404 and AP2 406 and receives a response to the Probe Request from AP1 404 successfully including information of AP2/BSS2 406. AP2 406 overhears the response to probe request with its BSS sent by AP1 404 and may not transmit a Probe Response frame to respond to Probe Request from STA1 402. However, STA2 408 does not receive the response since it is far away from AP1 404. After that, STA2 408 sends a Probe request to AP2 406. Then, both AP1 404 and AP2 406 receive a Probe End frame from STA1 402 before AP2 408 starts the transmission of response to the second Probe Request.

Figure 5:
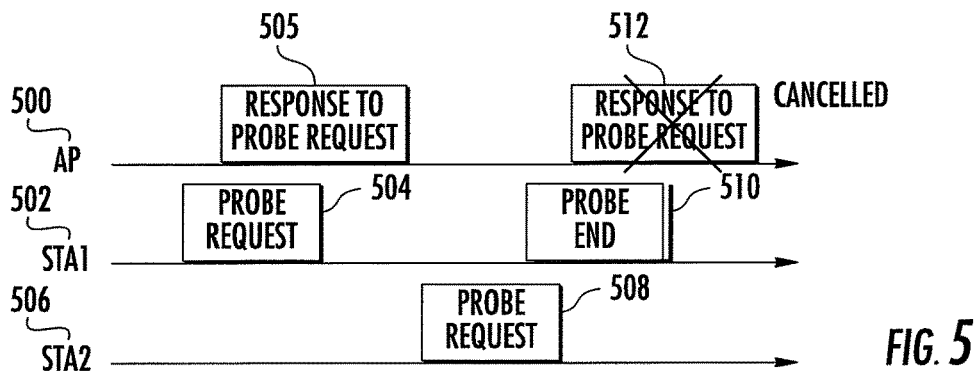
FIG. 5 shows an example of Probe Response cancellation.

FIG. 5 shows an example of Probe Response cancellation. STA1 502 sends a Probe Request 504 to AP1 500 and successfully receives the response 505 to the Probe Request 504 from AP1 500. STA2 506 sends a Probe request 508 to AP1 500. AP1 500 receives a Probe End 510 frame from STA1 502, and cancels the response at 512, before it starts the transmission of response to the second Probe Request 508.

Both examples above show that the cancellation of a probe response may cause delay for STA2's scanning of the AP. Therefore, allowing appropriate cancellation of probe response upon receiving Probe End frame is desirable to ensure proper operation of active scanning.

In a third scenario, robustness in the presence of high background load may be desirable in FILS. Further, it may be desirable to demonstrate providing a link set-up for media loads of at least 50%. However packets used to facilitate the FILS process may be of type Management. Management frames may be transmitted using the Access Category (AC) AC_VO. In the presence of high background load, management frames used in FILS may collide and compete for medium access using the same priority as other (data or management) frames using AC_VO, which may cause a delay in the initial link setup.

In a fourth scenario, an active scanning scheme using simplified Probe Request and Response may be desired. The application of Probe Request and Response may depend on whether two probe requests or two probe responses have the same value for most of their parameters or whether they have different values for some parameters.

Each of the above scenarios will now be discussed in more detail, with an understanding that the discussion for one scenario may be applicable to others. In the first scenario, a STA may be considered to have a pending Probe Request to transmit after receipt of a MLME-SCAN.request primitive with ScanType indicating an active scan, but before the conditions of an expiry of ProbeDelay time, or a receipt of a PHYRxStart.indication and obtaining channel access.

There may be three kinds of pending Probe Requests: a probe request targeted for a specific SSID/STA, a probe request targeted for an SSID list, or a probe request targeted for a wildcard SSID.

A pending probe request or an overheard probe request may be regarded to have the matched scanning target or parameters if certain conditions are met.

In a first case: if a pending probe request of interest is targeted for a specific SSID or specific medium access control (MAC) address of a second STA:

a) The Address 1 field in the overheard probe request may be a broadcast address or a specific MAC address of the second STA, and either item b) or item c) below are satisfied.

b) The targeted SSID/STA in the pending request may be a mesh ID/STA, and the Filter List in the overheard probe request may not include the mesh ID or the specific MAC address of the second STA in the pending request, and the Mesh ID in the overheard probe request is the wildcard Mesh ID or the specific Mesh ID of the second STA in the pending request.

c) The targeted SSID/STA in the pending request may not be a mesh SSID/STA, and the Filter List in the overheard probe request may not include the specific SSID or the specific MAC address of the second STA in the pending request, and the SSID in the overhead probe request may be a wildcard SSID, or the SSID in the overhead probe request may be the specific SSID of the second STA in the pending probe request, or the specific SSID of the pending probe request may be included in the SSID List element of the overheard probe request, and the Address 3 field in the overheard probe request may be the wildcard BSSID or the BSSID of the second STA in the pending probe request.

In a second case: if the pending probe request of interest is targeted for the wildcard SSID:

a) The Address 1 field in the overheard probe request may be a broadcast address and either item b) or item c) below may be satisfied.

b) The Mesh ID in the overhead probe request may be a wildcard Mesh ID or the specific Mesh ID of the second STA in the pending request.

c) The targeted SSID/STA in the pending request may not be a mesh SSID/STA, and the SSID in the overhead probe request is the wildcard SSID, and the Address 3 field in the overheard probe request is the wildcard BSSID.

In a third case: if the pending probe request of interest is targeted for a specific SSID list:

a) The Address 1 field in the probe request may be a broadcast address and either item b) or item c) below may be satisfied.

b) The targeted SSID list in the pending request may be a list of mesh IDs/STAs, and the Filter List in the overheard probe request may not include the targeted SSID list in the pending request, and the Mesh ID in the overheard probe request may be a wildcard Mesh ID.

c) The targeted SSID list in the pending request may not be a list of mesh SSID/STAs, and the Filter List in the overheard probe request may include the targeted SSID list in the pending request, and the SSID in the overhead probe request may be a wildcard SSID, or a specific SSID list in the pending probe request may be included in the SSID List element of the overheard probe request, and the Address 3 field in the overheard probe request may be a wildcard BSSID.

Figure 6:
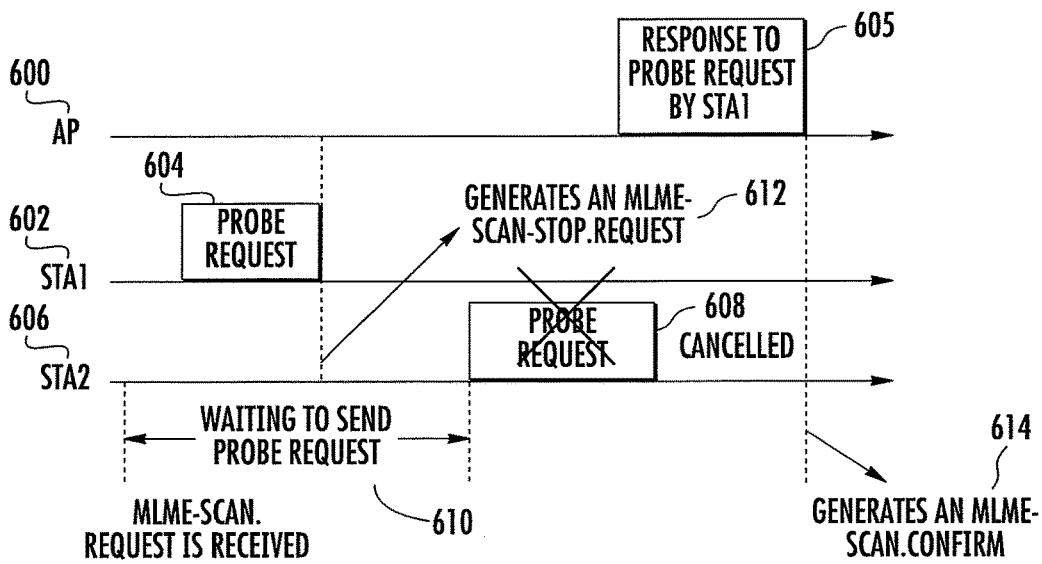
FIG. 6 shows an example of Probe Request cancellation.

In a first possible method regarding the first scenario, with reference to FIG. 6, in order to reduce the number of Probe request frames, a STA2 606 seeking initial link setup may cancel transmission of its Probe Request 608 if it overhears a Probe Request frame 604 with matched scanning target or parameters. Further, the corresponding probe response 605 may be received by the STA2 606 as well.

An active scanning procedure, upon receipt of an MLME-SCAN.request primitive with ScanType indicating an active scan, a STA2 606 may perform the following:

For each channel to be scanned:

a) Wait until a ProbeDelay time has expired or a PHY-RxStart.indication primitive has been received. Additionally, the STA2 606 may cancel an attempt of transmitting its Probe Request 608 for a second STA2 before the Probe delay timer 610 expires or a PHYRxStart.indication primitive has been received if the following conditions are met: The STA2 606 overhears a Probe Request frame 604 from STA1 602; The RSSI of the received Probe Request frame 604 is no less than a pre-defined threshold; and the overheard Probe request frame 604 has a matched scanning target or parameter with the pending probe request.

b) Perform a Basic Access procedure. Additionally, the STA2 606 may cancel an attempt of transmitting its Probe Request 608 for a second STA before it gains access to the medium only if the following conditions are met: The STA2 606 overhears a Probe Request frame 604; The RSSI of the received Probe Request frame 604 is no less than a pre-defined threshold; and The overheard Probe Request frame 604 has matched a scanning target with the pending probe request.

In a) and b) above, cancellation of a probe request may be done through primitives between the SME and MLME. Upon overhearing the Probe Request frame that meet the aforementioned conditions, the SME may generate a MLME-Scan-STOP.request 612 primitive for stopping the active scanning of the current channel. (This is one of the ways to cancel the probe request transmission. There are other ways. For example, the MAC layer may not send the probe request and instead wait for a longer time while waiting to receive a response.) This may be achieved by one of the following described by way of example.

In a first example, a new value "Stop current channel" may be added to the field of ScanStopType in the MLME-Scan-STOP.request 612 primitive. The MLME-Scan-STOP.request 612 primitive may be generated with the field of ScanStopType being set to "Stop current channel".

In a second example, a new value "Stop" is added to the field of ScanStopType, and a new field of "ChannelIndex" is added in the MLME-Scan-STOP.request 612 primitive. The MLME-Scan-STOP.request 612 primitive may be generated with the field of ScanStopType being set to "Stop", and the field of "ChannelIndex" being set to the index of the current channel.

In a third example, a new field of "ChannelList" is added in the MLME-Scan-STOP.request 612 primitive. The MLME-Scan-STOP.request 612 primitive is generated with the field of ScanStopType being set to "Set_Criteria", and the field of "ChannelList" being set to the ChannelList in the corresponding MLME-Scan.request excluding the index of the current channel.

If the probe request is cancelled for the current channel during the waiting time in steps a) or b) due to the receipt of overheard probe request with matched parameters/target, the STA may set a ProbeTimer to 0 and start the ProbeTimer. If PHY-CCA.indication (busy) primitive has not been detected before the ProbeTimer reaches MinChannelTime, then NAV may be set to 0 and the next channel may be scanned. Otherwise, the MLME may issue an MLME-SCAN.confirm 614 primitive with the BSSDescriptionSet containing information of the AP when Probe Response or Beacon frame is received from the AP for the first time. When ProbeTimer reaches MaxChannelTime, NAV may be set to 0 and the next channel may be scanned.

If the STA2 606 does not overhear any probe request with matched scanning parameters/target during the wait time in a) or b) above, and the STA2 606 gains access to a medium, the STA2 606 may send one or more probe request frames, each with the SSID and BSSID from the MLME-SCAN.request primitive.

In a second possible method regarding the first scenario, another active scanning procedure will now be described. Upon receipt of an MLME-SCAN.request primitive with ScanType indicating an active scan, a STA may, for each channel to be scanned, wait until a ProbeDelay time has expired or a PHYRxStart.indication primitive has been received (also referred to herein as action a) and may perform a Basic Access procedure (also referred to herein as action b), for example, per IEEE 802.11 WLAN MAC or PHY procedures. During Action a or Action b, the STA may further suspend or cancel an attempt of transmitting its Probe Request before the Probe delay timer expires or a PHYRxStart.indication primitive has been received if the following conditions are met: the STA overhears a Probe Request frame (also referred to herein as condition 1), the RSSI of a received Probe Request frame is no less than a threshold, for example, a predefined threshold (also referred to herein as condition 2), or an overheard Probe request has a matching scanning parameters/target with a pending probe request at the STA (also referred to herein as condition 3). The threshold may be set to a reasonably high value such that the conditional probability that the STA cannot decode the Probe Response frame responding to the overheard Probe Request, given that the overheard STA may decode such a Probe Response, is no more than a desired percentage (for example, 1%).

Alternatively, the STA may use pre-acquired knowledge of a location and a time of the day to further decide whether to suspend or cancel an attempt of transmitting its Probe Request when the aforementioned conditions are met. For example, the STA may know that it is in a densely populated location during peak time (such as a busy train station at peak commute time) and may decide to use Probe Request suspension/omission when overhearing Probe Request frames with matching scanning parameters/target. On the other hand, if the STA knows it is in a sparsely populated area during off-peak time (for example, in a park at 6 am), the STA may decide not to use Probe Request suspension/omission.

Alternatively, the STA may determine whether the STA is in an area with a dense population of WiFi devices (for example, IEEE 802.11 devices). If during actions a or b, the average received signal/energy level (within the time PHY_CCA.indicate(BUSY)) is no less than a predetermined threshold, S1, then the STA may determine that the STA is in an area with a dense population of WiFi devices and may use Probe Request suspension/omission when the conditions 1-3 are met. For example, the threshold of the received signal level may be set as:

transmit power−pathloss(d)−margin

The value of d may equal a small distance such as 5 or 10 meters (depending on a tradeoff to balance the number of probe requests and delay of active scanning). For a 5 GHz band in IEEE 802.11, the transmit power may be 23 decibel milliwatt (dBm) and the pathloss without shadow fading at d=5 m may be 56.5 dB. As such, the threshold may be calculated as −33.5 dBm-margin.

Alternatively the STA may choose a semi-random time period to send a Probe Request in an area with a dense population of WiFi devices. The random period may be dependent on the access class of the STA, for example, a machine-2-machine (M2M) type STA may send Probe Requests more frequently than other types of STAs.

The cancellation of the probe request may be performed via primitives between the SME and MLME (or using other methods as noted). Upon overhearing the Probe Request frame that meets the aforementioned conditions, the SME may generate a MLME-Scan-STOP.request primitive indicating suspending active scanning of the current channel. To achieve suspending active scanning or indicating suspending active scanning, a new value of "Suspend current channel" may be added to the field of ScanStopType in the MLME-Scan-STOP.request primitive. The MLME-Scan-STOP.request may be generated with the field of ScanStopType being set to "Suspend current channel".

Further, a new value of "Suspend" may be added to the field of ScanStopType and a new field of "ChannelIndex" may be added in the MLME-Scan-STOP.request primitive. The MLME-Scan-STOP.request may be generated with the field of ScanStopType being set to "Suspend", and the field of "ChannelIndex" being set to the index of the current channel.

A new field of "ChannelList" in the MLME-Scan-STOP.request primitive may also be added. The MLME-Scan-STOP.request may be generated with the field of ScanStopType set to "Set_Criteria" and the field of "ChannelList" set to the ChannelList in the corresponding MLME-Scan.request excluding the index of the current channel.

After receiving a MLME-Scan-STOP.request primitive indicating suspending the active scanning of the current channel, the STA may suspend transmitting a Probe Request frame and set a ProbeTimer to a value of current time minus the time it overheard the matched Probe Request frame that caused the suspension and start the ProbeTimer. This is equivalent to setting the ProbeTimer to zero when the matched Probe Request frame was overheard. The STA may keep monitoring the channel before the ProbeTimer reaches MinChannelTime and if one of the conditions below has been met, the STA may consider that the AP has already transmitted a Probe Response frame in response to the overhead Probe Request. The STA may further determine that it cannot decode the transmitted Probe Response frame in response to the overhead Probe Request and may, therefore, send its own Probe Request Frame.

Condition 1: The STA has detected the channel medium to be busy for a certain time duration at least a SIFS time after it overheard the Probe Request but no valid Probe Response, Beacon or FILS Discovery Frames is decoded. Further, the STA overhears an ACK from a STA that transmitted the Probe Request a SIFS after the detected busy channel medium time. An example value of the detected channel medium busy time preceding the overheard ACK is close to the transmission time of a Probe Response, Beacon or FILS Discovery Frame.

Condition 2: The STA overhears an ACK from the STA that transmitted the Probe Request at least T1 time after it overheard the Probe Request. An example value of T1 may be close to the transmission time of a Probe Response, Beacon or FILS Discovery Frame plus two SIFS time durations.

In order to facilitate condition 2, a field in the Broadcast/Multicast Probe Response frame may be used to indicate the STA that requested the Probe Response so that the requesting STA can respond with an ACK to the received Probe Response frame. There may be several ways to identify the STA that requested the Probe Response:

1. Add a new field or Information Element (IE) in the Probe Response Frame that signals the AID or Partial AID (PAID) of the STA whose Probe Request triggered the Probe Response.

2. Reuse the Duration/ID field in the MAC header of the Probe Response Frame to signal the AID or Partial AID (PAID) of the STA whose Probe Request triggered the Probe Response.

3. Indicate the Partial AID (PAID) of the STA whose Probe Request triggered the Probe Response in the PAID sub-field on the SIG field in the PLCP header.

Upon receiving a Broadcast/Multicast Probe Response Frame, the scanning STA that transmitted a Probe Request should check if the AID/PAID indication in the received Probe Response Frame matches its AID or PAID. If matched, it should respond with an ACK.

If a PHY-CCA.indication (busy) primitive has not been detected before the ProbeTimer reaches MinChannelTime, the STA may send its own Probe Request Frame if the average received signal/energy level during channel busy time before an attempt to transmit a Probe Request is suspended or cancelled is no less than a predetermined threshold, S 1. Otherwise, the STA may set NAV to 0 and scan the next channel.

If the STA receives a valid Probe Response, Beacon or FILS Discovery Frame before the ProbeTimer reaches MinChannelTime, the MLME, may issue MLME-SCAN.confirm primitive with a BSSDescriptionSet containing information of the AP when Probe Response or Beacon frame is received from the AP for the first time. When ProbeTimer reaches MaxChannelTime, the NAV may be set to 0 and a next channel may be scanned.

If the STA does not overhear any probe request with matched scanning parameters/target during the wait time in actions a or b, and the STA gains access to a medium, the STA may send a probe request to the broadcast destination address, with the SSID and BSSID from the MLME-SCAN.request primitive.

In a third method regarding the first scenario, upon receipt of the MLME-SCAN.request primitive with a ScanType indicating an active scan, a STA may perform active scanning by generating Probe Request frames and subsequently processing received Probe Response frames.

For each channel to be scanned, there may be a waiting time period from the time at which the STA is ready to scan the channel to the time at which the corresponding Probe Request frame is transmitted on to a wireless medium, as the transmission of the Probe Request frame may need to wait until the ProbeDelay time has expired or a PHYRxStart.indication primitive has been received. Further, the STA may perform a Basic Access procedure.

Unnecessary transmissions of Probe Request frames may be avoided and an active scanning procedure may be accelerated as described herein.

Upon receipt of the MLME-SCAN.request primitive with ScanType indicating an active scan, a STA may perform actions for each channel to be scanned. During the waiting time period for a STA to transmit a Probe Request to the channel to be scanned, if the STA has obtained the required information of the channel to be scanned, the STA may cancel transmission of its pending Probe Request frame and consider a completion of its scanning of the channel (for example, by generating an MLME-SCAN.confirm primitive with the BSSDescriptionSet containing all of the information of the channels received).

Figure 7:
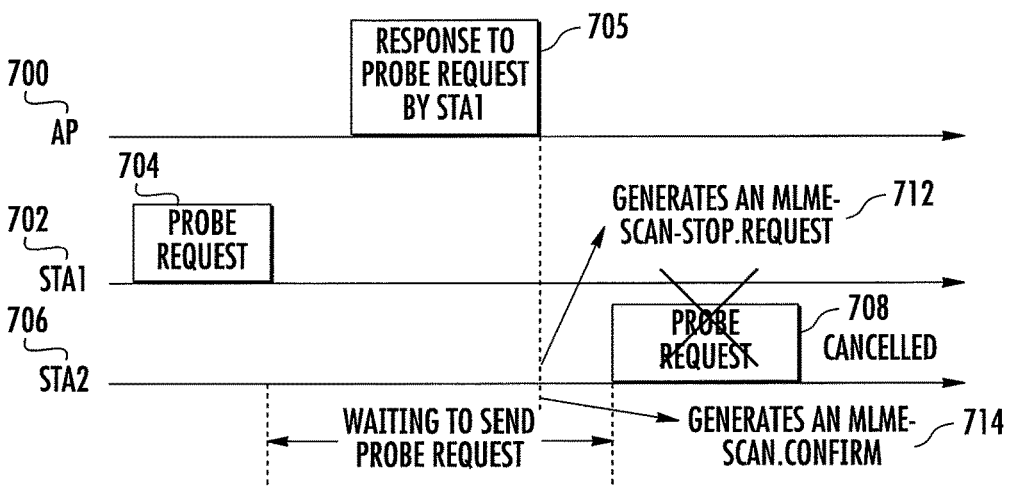
FIG. 7 shows another example of Probe Request cancellation.

This is shown in summary in FIG. 7, which shows STA1, 702, STA2 706, and AP 700. As shown, STA1 702 has transmitted probe request 704 to the AP 700 while STA2 706 is waiting to send a probe request. Upon STA2 706's detection of a response to STA1 702's probe request 705 for the same target, STA2 706 cancels its own probe request 708. Note that STA2 706's trigger event to cancel its probe request 708 need not be limited to the AP's response 705. The STA2 706 may obtain channel information from other sources, as discussed herein.

The cancellation 708 can be done through primitives between the SME and MLME (or using other methods as noted). Upon receiving the required information of the channel to be scanned during the waiting time period, the SME may generate a MLME-Scan-STOP.request 712 primitive indicating stopping the scanning of the current channel. This can be achieved by one of the following described by way of example.

In a first example, a new value "Stop current channel" is added to the field of ScanStopType in the MLME-Scan-STOP.request 712 primitive. The MLME-Scan-STOP.request 712 is generated with the field of ScanStopType being set to "Stop current channel".

In a second example, a new value "Stop" is added to the field of ScanStopType, and a new field of "ChannelIndex" is added in the MLME-Scan-STOP.request 712 primitive. The MLME-Scan-STOP.request 712 primitive is generated with the field of ScanStopType set to "Stop", and the field of "ChannelIndex" set to the index of the current channel.

In a third example, a new field of "ChannelList" is added in the MLME-Scan-STOP.request 712 primitive. The MLME-Scan-STOP.request 712 primitive is generated with the field of ScanStopType being set to "Set_Criteria", and the field of "ChannelList" being set to the ChannelList in the corresponding MLME-Scan.request excluding the index of the current channel.

Upon receiving the MLME-Scan-STOP.request 712 primitive, the MLME may cancel the transmission of a pending Probe Request frame 708 on the channel and generate an MLME-SCAN.confirm primitive with the BSSDescriptionSet containing all of the information of the channels received.

If the STA2 706 has obtained required information of several channels to be scanned during the waiting time period through other sources during the waiting time period for a STA2 706 to actually transmit a Probe Request to the channel to be scanned, then the STA2 706 may cancel the transmission of its pending Probe Request frames 708 on channels whose information is received. The cancellation is done through primitives between the SME and MLME. Upon receiving information of several channels to be scanned during the waiting time period, the SME may generate a MLME-Scan-STOP.request 712 primitive indicating a stop of scanning of the channels. This generation of an MLME-Scan-STOP.request 712 primitive indicating a stop of scanning of the channels may be achieved by any of the following. It may be generated by adding a new "Stop" value to the field of ScanStopType and a new field of "ChannelList" in the MLME-Scan-STOP.request 712 primitive. The MLME-Scan-STOP.request 712 may be generated with the field of ScanStopType set to "Stop" and the field of "ChannelList" set to the indices of the channels whose information is received.

Further, a new field of "ChannelList" may be added in the MLME-Scan-STOP.request 714 primitive. The MLME-Scan-STOP.request 712 may be generated with the field of ScanStopType set to "Set_Criteria" and the field of "ChannelList" set to the ChannelList in the corresponding MLME-Scan.request excluding the channels whose information is received.

Upon receiving the MLME-Scan-STOP.request 712 primitive, the MLME may cancel the transmission of its pending Probe Request 708 frame according to the parameters in the MLME-Scan-STOP.request 712 (for example, the channels whose information is received) and generate an MLME-SCAN.confirm 714 primitive with the BSSDescriptionSet containing all of the information of the channels received.

If the STA2 706 (or the SME within the STA2 706) decides that it has found an AP 700 to which it may associate, then the STA2 706 (or the SME within the STA2 706) may generate a MLME-Scan-STOP.request 712 primitive with the field of ScanStopType set to "Stop_All" to stop the entire active scanning process and proceed to the next steps of link setup (for example, network discovery, authentication, association, and the like). Otherwise, the STA 706 may go to the next channel and perform active scanning.

The STA2 706 may obtain channel information from other sources via the following:

The STA2 706 may monitor the channel and receive frames that are intended for the STA2 706. For example, the STA2 706 may receive broadcast frames, which provide channel information, such as, a Beacon frame (including short beacon or FILS beacon/FILS Discovery frame containing a subset of the Beacon information that is required for the STA to connect to the AP), a measurement pilot frame, a broadcast Probe Response frame, and the like.

Alternatively, the STA2 706 may receive channel information through another network interface, if multiple network interfaces are supported. In this instance, certain MLME SAP primitives may be defined to provide notifications to the MAC entity that conducts a scanning procedure.

The waiting time between receiving the MLME-SCAN.request 712 primitive and the transmission of the corresponding Probe Request frame may be adjusted in order to provide a tradeoff between overhead caused by Probe Request/Response frame exchanges and the latency in obtaining the required channel information. This is particularly useful when there is a large number of STAs that are conducting active scanning and the AP may use broadcasted Probe Response frames and/or other broadcasted frames to provide channel information as its response to received Probe Request frames.

The adjustment of the waiting time may be performed by setting appropriate values for a ProbeDelay parameter. Alternatively, the STA2 706 may dynamically adjust its waiting time or backoff window/procedure in a channel access procedure based on the STA's assessment about the channel conditions or other considerations.

In a fourth method regarding the first scenario, a STA conducting scanning may be required to scan all the channels in the ChannelList provided by the MLME-SCAN.request primitive. Further, the STA may issue an MLME-SCAN.confirm primitive with the BSSDescriptionSet containing the information of the channels gathered during the scan. The STA may scan one channel at a time, until all channels in the ChannelList have been scanned.

An AP may obtain certain knowledge about the channels that are other than the AP's own operational channel. An AP may provide the knowledge of other channels to STA in order to accelerate the scanning process for a STA so that the information of the channels in the ChannelList may be gathered.

In channel information provisioning frames, a transmitting STA may include channel information of other channels, in addition to its own operational channel. Examples of channel information provisioning frames include a Beacon frame including a short beacon or a FILS beacon/Discovery frame containing a subset of the Beacon information important for the STA to connect to the AP, Probe Response frame, measurement pilot frame, and the like. Channel information of other channels may be encoded in an Information Element (IE) included in the channel information provisioning frames. Similarly, this may also be utilized in passive scanning.

During scanning a channel, if a STA receives required information of other channels, the SME may generate an MLME-Scan-STOP.request with the field of ScanStopType set to "Set_Criteria" and a new field of "ChannelList" set to the ChannelList in the corresponding MLME-Scan.request excluding the indices of the channels whose information has been received. For example, during scanning of a channel, for example, Ch-A, if a STA obtains all the required information of another channel, for example, Ch-B, the STA may skip the explicit scanning procedure for the channel, for example, Ch-B, and use the Ch-B information (obtained during the scanning of Ch-A) later in link setup. Similarly, this may also be utilized in passive scanning.

When scanning a channel such as Ch-A, if a STA obtains some information of Ch-B but not all required information, then the STA may conduct scanning on Ch-B by using SSID information obtained during the scanning of Ch-A so that a Probe Request with Wildcard SSID may be avoided.

A STA conducting active scanning may also provide or signal the STA's ChannelList (as specified in the corresponding MLME-Scan.request primitive) in its Probe Request frame to serve as an indicator to request a STA providing Probe Response to also include the information of other channels in the ChannelList as well as the channel under current scanning procedure. Such ChannelList may be encoded as an IE in the Probe Request frame.

In a fifth method regarding the first scenario, a large number of STAs may enter into a space at the same time and all or most may seek to assess services available to them in the new location (for example, when a train is arriving in a station). It may be assumed that all of the STAs on the train prior to arrival at the station were connected via an AP on the train and that the AP on the train is aware of its location and that it has arrived at a station. Hence, the AP on the train may be aware that many STAs on the train may be transferring from the train's AP to the APs in the station and that many STAs in the station may be transferring from the APs in the station to the train's AP.

In one approach, a STA or multiple STAs may be associated with an AP that is mobile and aware of its location. When the AP approaches a location where some or all of its STAs may be transferring to a new AP or looking for additional services, the AP may anticipate this need and provide the following services for its associated STA(s) and STA(s) that may seek to associate with it.

The AP may send a broadcast message to its associated STA(s) that they are reaching an area in which additional APs and services may be available (i.e. the train is entering the station). This message may also inform the STA(s) that the AP may be sending a Probe Request at some defined time in the future or has sent it in the past. It may also indicate that an additional Probe Request may be sent on channels other than the channel that the AP and the STA(s) are currently using.

The message may also include information that the AP has about services available in the area entered. Additionally, the notice that the AP may send the Probe Request may be used by associated STA(s) to suppress their own Probe Request, and may rely on the AP's proxy Probe Request to assess the new environment.

At an appropriate time (for example, the time indicated in the broadcast message), the AP may send a proxy Probe Request for all of its STA(s).

The STA(s) may then receive the AP proxy Probe Request, and wait for the Probe Responses from the available AP(s) and services in the area and also proceed as if the AP proxy Probe Request had been sent by the STA(s).

The AP may also communicate with the AP(s) or perform a network services query in the new area, either over the air or via a DS. The AP may indicate that it is arriving in their area (for example, the train entering their station). Upon receiving this information the AP(s) may notify their STA(s) that an arriving AP is now present in their area. The APs may then choose to also issue a broadcast message to their associated STA(s) as described above, which may be followed by the AP sending a probe request as described above.

In another approach, a STA or multiple STAs associated with an AP may request that the AP send a proxy Probe Request for the STA(s). The request may be initiated by a Management Frame or it may be piggybacked on to a data, management, or ACK frame from the STA. The STA may also indicate any channels and a time that the STA desires the proxy Probe Request to be made. When a STA makes the request, the AP may follow a similar procedure as described herein.

The AP may send a broadcast message to its associated STA(s) that it intends to send out a Probe Request and may indicate when it seeks to send the Probe Request and which channels it may use to send the request. Associated STA(s) may suppress their own Probe Requests and may rely on the AP's proxy Probe Request.

When the AP sends the proxy Probe Request, the STA(s) may then hear the AP proxy Probe Request, and wait for the Probe Responses, then proceed as if they had sent a Probe Request themselves.

In another approach, an AP may receive a message either via the DS or over the air from another AP indicating that the AP is entering its area or has STA(s) which are looking for services. The AP that sent the message may also indicate that it has new services to offer the STA(s) associated with the AP receiving the message. Upon receiving this message the receiving STA may notify its STA(s) of the information, or may notify its STA(s) that it will be sending a proxy Probe Request, which may allow its STA(s) to then receive the Probe Response from the APs and services in the area. It is noted that it may be assumed that the AP originating the message may respond to the Probe Request.

In a sixth method regarding the first scenario, when there is no AP operating on the channel to be scanned actively, but the adjacent channel may cause the scanning STA to scan the channel for the MaxChannelTime, the decision of the scanning STA whether or not to continue scanning of the channel beyond the initial scanning time may be based on whether PHY-RxStart.indication primitive instead of PHY-CCA.indication (busy) has been received by that time.

Upon receipt of the MLME-SCAN.request primitive with ScanType indicating an active scan, a STA may use the following procedure:

For each channel to be scanned:

a) Wait until the ProbeDelay time has expired or a PHYRxStart.indication primitive has been received.

b) Perform a Basic Access procedure as described herein.

c) Send a probe request to the broadcast destination address, with the SSID and BSSID from the MLME-SCAN-.request primitive. When the SSID List is present in the MLME-SCAN.request primitive, send one or more Probe Request frames, each with an SSID indicated in the SSID List and the BSSID from the MLME-SCAN.request primitive.

d) Set a ProbeTimer to 0 and start the ProbeTimer.

e) If PHY-RxStart.indication primitive has not been detected before the ProbeTimer reaches MinChannelTime+PHY RX latency, or at least one PHY-RxStart.indication primitive has been detected before the ProbeTimer reaches MinChannelTime+PHY RX latency but all of them are triggered by Probe Request Frames, then set NAV to 0 and scan the next channel, else the MLME shall issue MLME-SCAN.confirm primitive with the BSSDescriptionSet containing information of the AP when Probe Response or Beacon frame is received from the AP for the first time. Note that by the time ProbeTimer reaches MinChannelTime+ PHY RX latency+MAC processing latency, the scanning STA may determine whether all of PHY-RxStart.indication primitives detected before the ProbeTimer reaches MinChannelTime+PHY RX latency are triggered by Probe Request Frames. The value of PHY RX latency+MAC processing latency may be smaller than SIFS time, since SIFS time=PHY RX latency+MAC processing latency+ PHY TX latency. When ProbeTimer reaches MaxChannelTime set NAV to 0 and scan the next channel.

With respect to the second scenario, efficient active scanning will now be described. An outstanding Probe Request is a Probe Request that an AP receives from a unique STA that has not been responded to yet, meanwhile the STA's associated MaxChannelTime for scanning specified in the Probe Request has not elapsed yet. In order to reduce premature cancellation of a response to a Probe Request frame, a STA may cancel a response to a Probe Request frame if for each outstanding Probe Request the STA receives a valid Probe End frame from a corresponding STA that sent the Probe Request.

For example, if a STA receives a Probe End frame and the STA has not started transmitting a Probe Response or the STA is currently transmitting a Probe Response frame to the transmitter of the Probe End frame, a response to Probe Request frame may be transmitted if the criteria below are met:

a) The Terminate All Requests field of the BSS Type element in the Filter List of the Probe End frame is set to 0.

b) The STA is an AP STA and the Infrastructure field of the BSS Type element in the Filter List of the Probe End frame is set to 0 or the SSID, the BSSID, or the HESSID of the STA is not included in a Filter List of the Probe End frame; or (1) The BSS of the STA is an IBSS and the IBSS field of the BSS Type element in the Filter List of the Probe End frame is set to 0, or the SSID or the BSSID of the STA is not included in the Filter List of the Probe End frame; or (2) The STA is a mesh STA and the MBSS field of the BSS Type element in the Filter List of the Probe End frame is set to 0 or the Mesh ID or the MAC Address of the mesh STA is not included in the Filter List of the Probe End frame.

c) For at least one outstanding Probe Request, either a corresponding Probe End frame has not been received or a corresponding Probe End frame has been received but does not meet conditions a) and b) above.

If the above criteria are not met, the receiver of Probe End frame may transmit or retransmit a response to Probe Request frame once. However, it may be required that the response may not be transmitted or retransmitted more than once.

With respect to the third scenario, efficient active scanning and a FILS process will now be described. Further, Access Category for FILS will now be described. In order to prioritize the transmission of management frames used for FILS, an access category called AC_FILS may be used for the Management frames that are utilized in the FILS process. FILS frames that may be transmitted using AC_FILS include:

A Probe Request frame or it may be required that the Probe Request frame be only transmitted by a STA that is not yet associated with a BSS.

Probe Response frames.

Authentication frames.

Association Request frames.

Association Response frames.

Action frames for Generic Advertisement Service (GAS) Query/Response or it may be required that Action frames for GAS Query/Response be only transmitted by a STA that is not yet associated with a BSS.

Management frames used for Security Setup or it may be required that the Management frames be only used for Security Setup transmitted by a STA that is not yet associated with a BSS.

Access Category AC_FILS may be determined by the AP. In order to speed up the FILS process, the AC_FILS may have smaller Arbitration Inter Frame Space (AIFS) values, smaller Minimum Contention Windows (CWmin) and Maximum Contention Windows (CWmax) size compared to Access Category Voice (AC_VO). In addition, a transmission opportunity (TXOP) limit, which may be defined for AC_FILS, may be shorter or equal to the TXOP limit allowed for AC_VO.

Further, because FILS frames are localized to the MAC layer in IEEE 802.11 communication, no new AC may need to be assigned. FILS frames may be transmitted using localized FILS enhanced distributed channel access (EDCA) parameters similar to those described above both internal to the STA and on a wireless medium external to the STA. It is noted that an AC_FILS access category definition is exemplary herein and may be defined using different terminology.

Figure 8:
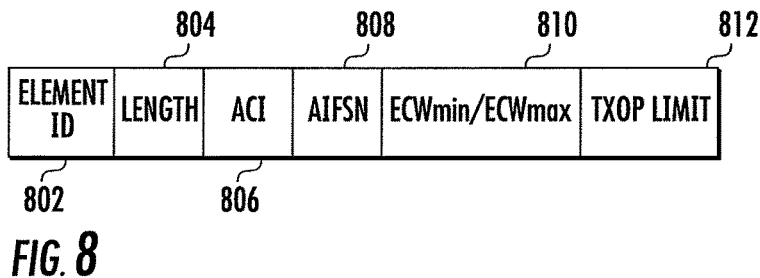
FIG. 8 shows an example of a FILS EDCA parameter set information element.

The description will now describe an AC_FILS EDCA parameter set information element and access option information element. FIG. 8 shows an example of a FILS EDCA parameter set information element. An AC_FILS EDCA parameter set information element and Access Option Information Element is described herein. An information element to provide information on the EDCA parameter sets for AC_FILS, or local FILS EDCA parameters for FILS frames is described herein. The FILS EDCA parameter set information element may contain the following fields:

Element identity (ID) 802. The Element ID serves to identify that the current Element ID is the FILS EDCA parameter set information element.

Length (in bytes of the information ID) 804.

AC Index (ACI) for AC_FILS ACI 806. In order to accommodate available ACs, ACI may be three bits or more to define a new AC. For example, the AC Index for AC_FILS may be 4 bits. It may be required that the ACI field be optional if only localized FILS EDCA parameters are used for FILS frames.

Arbitration Inter Frame Space (AIFS) Number (AIFSN) 808. For the AIFSN associated with AC_FILS, the default AC_FILS may be 1.

Exponent CWmin (ECWmin) and exponent CWmax (ECWmax) 810. The ECWmin and ECWmax define the CWmin and CWmax, respectively, that STAs desiring FILS with a current AP should adapt and are defined to be CWmin=2ECWmin−1 and CWmax=2ECWmax−1. CWmin and CWmax may be sufficiently large to accommodate an expected number of STAs performing FILS operations in a coming period by preventing excessive collisions and retransmissions of FILS frames since excessive collisions and retransmissions of FILS frames may lead to excessive delays in initial link setup time.

TXOP Limit 812. The TXOP Limit contains the limit of the TXOP associated with FILS TXOP.

An AC_FILS or a local FILS EDCA parameter set information element may be included in selected beacons, short beacons, FILS Discovery frames, Probe Response frames, or any other type of control or management frames. A STA may include an AC_FILS or a local FILS EDCA parameter set information element in a Probe Request frame, or any other type of control or management frames. The AIFSN, ECWmin, ECWmax fields may be set to zero in these frames from the STAs to the AP to indicate to the AP that the STAs are capable of expedited FILS.

Figure 9:
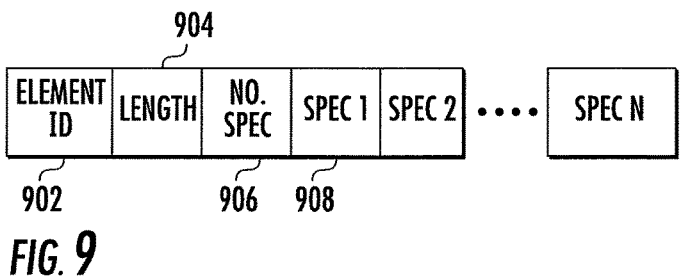
FIG. 9 shows an Access Option Information Element.

FIG. 9 shows an Access Option Information Element.

The AP may include other information for UL channel access that may be related to FILS frames in its beacons, short beacons, probe response frames or any other type of control or management frames. For example, the AP may indicate one or more beacon intervals or beacon sub-interval that may be used for FILS operations only where non-FILS frames may not be transmitted. In addition, the AP may indicate that a subset of STAs may conduct FILS operations in one or more beacon intervals or beacon sub-intervals. In another example, the AP may indicate one or more beacon intervals or beacon sub-intervals that may be used for FILS operations with higher priority and where non-FILS frames may be transmitted with lower priority than FILS frames. The Access Option Information Element may be generalized for all type of STAs and for all types for frame transmissions.

The Access Option Information Element may include the following fields:

Element ID 902: ID identifying the IE as an Access Option IE.

Length 904: Length in octets of the remainder of the IE.

Number of Spec Fields 906: the number of Spec Fields contained in the remainder of the IE.

Spec 1-Spec N Field 908: each field contains a set of specifications for STA access. Each field may include specifications for a set of time intervals, a set of STAs, a set of traffic, or any combination thereof.

Figure 10:
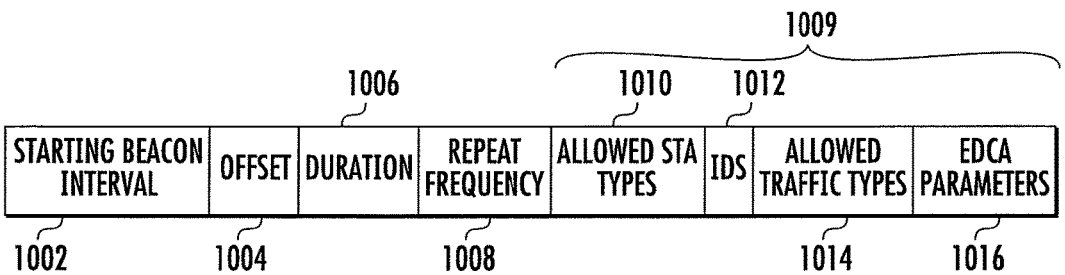
FIG. 10 shows Spec i Fields of an Access Option IE.

FIG. 10 shows Spec i Fields of an Access Option IE. In FIG. 10, 1≤i≤N. The Spec Field may include the following subfields of scheduling information:

Start Beacon Interval 1002: The Start Beacon Interval in which the access policy starts. Since a beacon may not always be transmitted at the TBTT, the Start Beacon Interval may refer to the TBTT of the beacon that commences the targeted Beacon Interval. Alternatively, this subfield may include a particular value of the TSF timer.

Offset 1004: The offset of the start of the period in which the access policy starts in microsecond or any other time unit from the beacon, or TBTT or to a reference point of time of the TSF timer.

Duration 1006: Specifies the duration of the period during which the access policy is valid.

Repeat Frequency 1008: represents how often the access policy specified in the Access Option IE is repeated. The subfield may be defined in number of beacon intervals or mircoseconds or other time units.

The Schedule Info Subfields may be required, whereas in other embodiments, the Schedule Info Subfields may not be required. For example, when the Access Option IE is contained in a beacon or a short beacon or other type of management or control frame to announce that the access policies specified are valid for the beacon interval or beacon sub-interval or other durations directly following the transmitted frame.

The Spec Field 1009 may also include:

Allowed STA Types 1010: The types of STAs that are allowed to conduct medium access for the specified interval, priority, traffic, and/or EDCA parameters. Examples of STA types may be FILS STAs, sensor and meter STAs, cellular offloading STAs, battery-powered STAs, electrical main-powered STAs, and the like. The Allowed STA Types field may be a bit-map indicating the various types of STAs allowed.

IDs 1012: This subfield specifies the ID(s) of a STA or a particular group of STAs that are allowed to access the medium for the specified interval, priority, traffic, and/or using the specified EDCA parameters.

Allowed Traffic Types 1014: specifies the traffic types that are allowed access medium for the specified interval, STA types, using the specified EDCA parameters. For example, some of the allowed traffic types may be FILS frames, AC_VO frames, AC_VI frames, sensor and meter sensor frames, red-alert frames reporting fire or detection of intruders, and the like. The Allowed Traffic Types field may be a bit-map indicating the various types or ACs of traffic allowed.

EDCA Parameters 1016: indicates the different set or sets of EDCA parameters that may be used for the specified interval, STA types, priority, and/or traffic. The EDCA parameter sets may be explicitly specified in the Spec i Field. Alternatively, indices of EDCA parameter sets specified in FILS EDCA Parameter Set Information Element may be used.

It is noted that the FILS EDCA Parameter Set IE, the Access Option IE or any subset of the fields or subfields thereof may be a subfield or subsets of subfields of any existing or new IE, or as a part of any control, management frames or MAC/PLCP headers.

The description will now describe STA/AP behavior. An AP that is capable of expedited FILS may determine EDCA parameters such as AIFS, CWmin, CWmax and TXOP Limit for AC_FILS depending on the FILS requirements, current network load, and the like, or an AP may determine the EDCA parameters for FILS frames without requiring that the FILS frames belong to a separate AC. An AP may change the AC_FILS or local FILS EDCA parameters from time to time and may include the AC_FILS or local FILS EDCA Parameter Set and/or Access Option IE in its beacons or short beacons or FILS Discovery frames or Probe Responses or other types of management or control frames.

In addition, before a STA that is capable of expedited FILS, the STA receives a beacon or other type of management or control frame including the AC_FILS or local FILS EDCA parameter set information element and/or Access Option IE. The STA may send a Probe Request using the default EDCA parameters for AC_VO, send a Probe Request using default EDCA parameters specified for AC_FILS or FILS parameters, or set the fields of AIFSN, ECWmin, ECWmax in the AC_FILS or local EDCA parameter set information element included in the Probe Request to zero.

After a STA that is capable of expedited FILS receives a beacon or a short beacon or other management, FILS Discovery frame, or control frames that include the AC_FILS or local FILS EDCA parameter set information element and/or the Access Option IE, the STA may obey access policies, such as access intervals, parameters, and the like, set by the Access Option IE when attempting to conduct any transmissions or medium access. In addition, the STA may send a Probe Request using the EDCA parameters specified for AC_FILS or local FILS frames in the beacon. Further, the STA may set the AC_FILS or local FILS EDCA parameter set information element to the values received from an AP to indicate that it is also capable of expedited FILS.

When the AP capable of expedited FILS receives a Probe Request frame from a STA including an AC_FILS or local FILS EDCA parameter set information element with the AIFSN, ECWmin and ECWmax fields set to zero, the AP may respond with a Probe Response with the AC_FILS or local FILS EDCA parameter set information element including all the AC_FILS or local FILS EDCA parameters.

The STAs and the AP may use the AC_FILS or local FILS EDCA parameters and the access policies set by the Access Option IE for the remainder of the FILS process. If there are multiple APs in the vicinity, a STA may adapt the AC_FILS or local FILS EDCA parameters and access policies that the STA desires to associate with. The AP may use a different set of AC_FILS or local FILS EDCA parameters or access policies than advertised in its beacon for FILS related packet exchanges.

A STA that becomes associated with an AP or has already been associated with an AP may obey the most up-to-date access policies set by the most recent Access Option IE sent by that AP in all subsequent medium access.

Figure 10A:
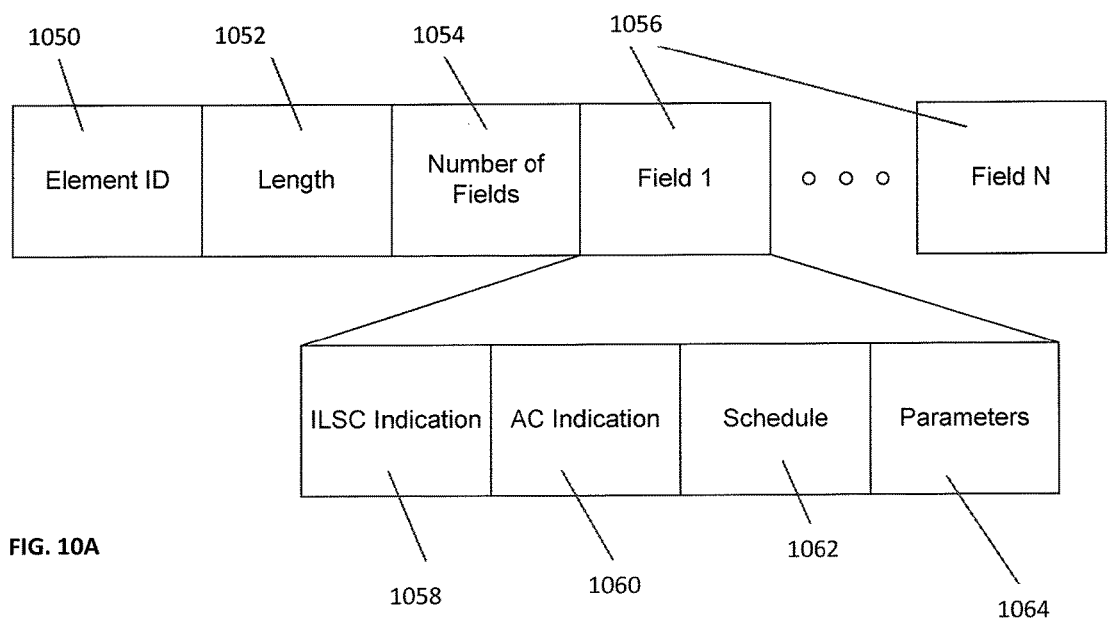
FIG. 10A shows an ILS Element design.

The description will now describe an enhanced ILS element that is an alternative to the Access Option Information Element. The ILS Element design discussed above may be further extended and enhanced with a schedule of ILS intervals and the associated parameters. An example of such an enhanced ILS Element is shown in FIG. 10A. The enhanced ILS Element may be included in frames such as Beacon, Short Beacon, Probe Response, FILS Discovery frames, or any other type of Control, Management, or other type of frames.

The enhanced ILS element fields may include the following:

Element ID 1050: The Element ID indicating that this is an enhanced ILS element Length 1052: The length of the enhanced ILS element Number of Fields 1054: the number of fields contained in the enhanced ILS element Field 1-Field N 1056: each field may contain specifications for ILS or for regular traffic for a particular period(s) or beacon subinterval(s) and may have the following subfields:

ILSC Indication 1058: the ILSC Indication subfield may indicate the ISL category or categories of the STAs that are allowed to conduct association with the AP in the period(s) or beacon subinterval(s) indicated in the Schedule subfield. The ILSC Indication 1060 may be implemented as a bitmap.

AC indication subfield 1060: An AC Indication subfield 1060 may indicate the access category or categories of traffics that the STAs may transmit in the period(s) or beacon subinterval(s) indicated in the Schedule subfield. The AC Indication 1060 may be implemented as a bitmap.

Schedule 1062: the Schedule Subfield 1062 may indicate the duration of the period(s) or beacon subinterval(s). For example, if duration T1 is specified in Field 1, duration T2 is specified in Field 2, and assuming that Period 1 starts at T0 (the starting point T0 may be referenced to a targeted beacon time, or to the end of current packet that contains the enhanced ILS element), then Period 1 may last from T0 to T0+T1 and Period 2 may be from T0+T1 to T0+T1+T2. Similarly Period N may be from T0+ . . . +TN−1 to T0+ . . . +TN−1+TN.

Parameters 1064: the parameters for FILS packets and for non-FILS traffic packets. These parameters may include:

EDCA parameters: EDCA parameters for each of the ILSCs that are allowed in the period(s) and beacon subinterval(s), and for each of ACs that are allowed to be transmitted in the period(s) and beacon subinterval(s); and AP/BSS: an AP may include the enhanced ILS information for neighboring APs as a part of neighbor reporting in the enhanced ILS element.

The description will now describe differentiated FILS procedures using an enhanced ILS element. An AP may include the enhanced ILS element in its beacons, short beacons, FILS Discovery frames, and Probe Responses to inform all STAs for one or more period(s) and beacon subinterval(s) that:

one or more ILSC(s) of STAs that are allowed to conduct association with the AP;

and/or the EDCA parameters that the FILS STAs should use for FILS related packet exchanges for that period(s) or beacon subinterval(s);

and/or one or more AC(s) that the associated STAs may transmit during that period(s) or beacon subinterval(s);

and/or the EDCA parameters that the associated STAs should use for each of the AC during that period(s) or beacon subinterval(s).

Using the enhanced ILS element, the AP may allocate for different periods or beacon subintervals different variation of combinations of the various ILSCs of FILS traffic and various ACs of traffics from STAs that are currently associated. In certain period(s) or beacon subintervals, the AP may disallow certain ILSC STAs or ACs of traffic, such as AC_BK or AC_BE, to allow faster association process for FILS STAs or a subset of FILS STAs.

The ILSCs of STAs may be determined by the highest AC of ongoing traffic that the STA is transmitting/receiving. In another implementation, the ILSCs of STAs may be determined by classes of SLAs (Service Level Agreements) of the STAs, such as premium or regular customers. The ILSCs of STAs may also be determined randomly, or be determined based their MAC addresses, for example, the 4 LSB or MSB of the STA's MAC address.

The APs in OBSS may coordinate their scheduling of different ILSCs and ACs of traffic. An AP may also use enhanced ILS element to indicate neighboring APs' schedules for different ILSCs and ACs of traffic.

A FILS STA that wishes to conduct FILS process, when hearing Probe Responses, FILS Discovery frames, beacons, short beacons, or other type frames containing the enhanced ILS element, it may select to associate with the AP that, among other configurations, has the earliest schedules for the ILSC that the FILS STA belongs to. The FILS STA may then adapt the specified EDCA parameters during the specified period and conduct the FILS process.

The description will now describe autonomous FILS parameter adjustment. A FILS STA may adjust its EDCA parameters autonomously, without a need of receiving any messages or indications. When a STA has lower ILSC, e.g., if it only has non-real time traffic, when it needs to conduct FILS process with an AP/BSS that is experiencing a high traffic load, either from associated STAs or from the other STAs conducting initial link setup, it may autonomously adapt the EDCA parameters of a lower ILSC or a lower AC, in order to assist the reduction of link access contention by shaping the bursty link access demands over time.

A FILS STA may invoke the autonomous FILS parameter adjustment based on certain pre-defined triggers:

Location/time/context based triggers with pre-acquired knowledge, for example, an FILS STA arrives at a busy train station at a rush hour, if it has pre-acquired knowledge that the AP/BSS has a high traffic load; and Monitoring/measurement based triggers, for example, a FILS STA has sensed the wireless medium is highly loaded or highly contentious.

Figure 11:
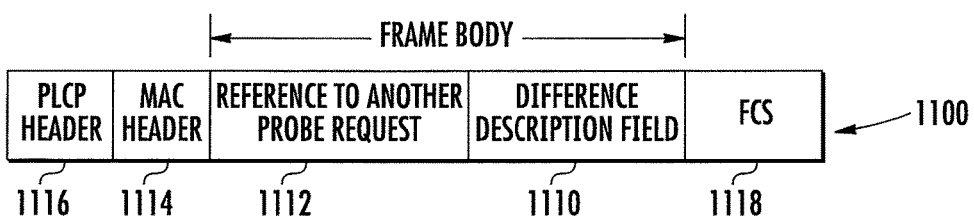
FIG. 11 shows a first example of a simplified probe request frame with a different description field.
Figure 12:
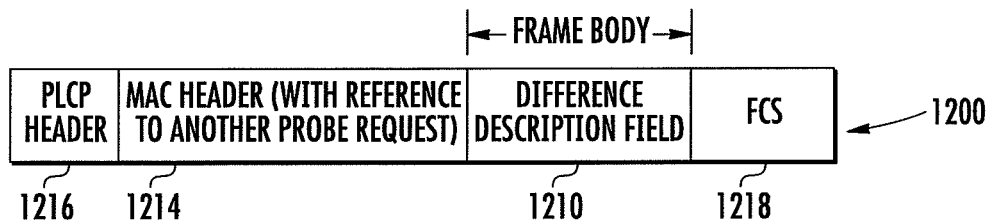
FIG. 12 shows a second example of a simplified probe request frame with a different description field.

With respect to the fourth scenario, differential probe request frame formats are described as shown in FIGS. 11 and 12. In some instances, some or most of the scanning parameters of a pending probe request of a STA are the same as those of an earlier received probe request, whereas some parameters are different. In order to allow for more frequent utilization of the simplified Probe Request frames 1110, 1210 (shown in FIGS. 11 and 12) to reduce overhead. A difference description field or IE 1100, 1120 may be used in the simplified Probe Request frame 1100, 1200 to indicate the difference between the parameters of the earlier overheard/received probe request and parameters that the STA seeks to send in a probe request.

The difference description fields are utilized to indicate the difference between an earlier overheard/received Probe Request and Probe Request to be transmitted in a simplified Probe Request frame. The frames 1100, 1200 may both contain references to another probe request. In the frame 1100 the reference is in its own field 1112 and in the frame 1200, the reference is in the MAC Header 1214. Note that both frames 1100 and 1200 contain PL CP headers 1116, 1216 and FCS fields 1118, 1218

Figure 13:
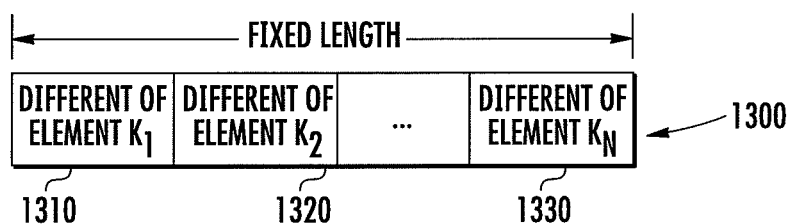
FIG. 13 shows an example of a difference field/IE in a simplified probe request frame.

In a first difference description field for a request approach, the difference description field in a simplified Probe Request frame 1300, shown in FIG. 13 includes a fixed number of sub-fields 1310, 1320, 1330 or IEs each describing the difference of a predefined element in the Probe Request. Each sub-field 1310, 1320, 1330 or IE may not include Element ID since the sequence and meaning of each field or IE is pre-determined.

STET the difference of each element may be encoded appropriately according to the nature of the element. For example, the difference in the parameter of SSID list may be encoded as a one-bit indicator of plus/minus sign and a subset of SSID list. If the earlier received Probe Request frame has the SSID list element={SSID1, SSID2, . . . , SSID10} and the pending Probe Request has the SSID list element={SSID1, SSID2, . . . , SSID8}, then the difference of SSID list parameter may be encoded as one bit indicator as "-" and SSID subset as {SSID9,SSID10}.

Figure 14:
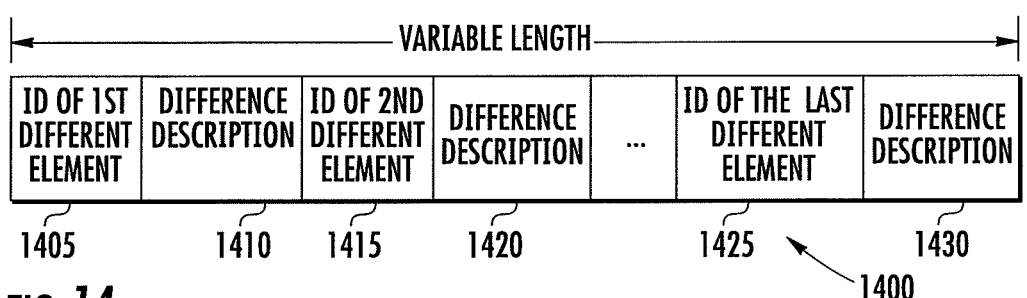
FIG. 14 shows a difference field/IE in a simplified probe request frame.

In a second difference description field approach for a request, the simplified Probe Request frame 1400 shown in FIG. 14 includes a variable number of sub-fields or IEs each containing an Element ID 1405, 1415, 1425 and a description 1410, 1420, 1430 of the difference of the corresponding element (identified by the Element ID) in the Probe Request 1400. The length of the difference description field 1410, 1420, 1430 or IE of a particular element is pre-determined (has a one-to-one mapping with the corresponding Element ID).

For each channel to be scanned, there may be a waiting time period from the time at which the STA receives a MLME-SCAN.request primitive indicating an active scan to the time at which the corresponding Probe Request frame is transmitted. The transmission of the Probe Request frame may wait until a ProbeDelay time has expired or a PHY-RxStart.indication primitive has been received and the STA may perform the Basic Access procedure.

Upon receipt of the MLME-SCAN.request primitive with ScanType indicating an active scan, a STA may use the procedure described herein for each channel scanned.

During the waiting time period for a STA to transmit a Probe Request to a channel to be scanned, the STA may check if it has overheard a Probe Request sent by another STA. If the STA has not heard a Probe Request, the STA may proceed to transmit a regular Probe Request frame to the AP. The remaining scanning procedure may be the same as that of a regular Probe Request.

If the STA has heard a Probe Request, the STA may compare the parameters in the overheard/received probe request with the parameters the STA wants to transmit in the pending probe request. If the number of different parameters is greater than K, then the STA may transmit a regular Probe Request frame to the AP. The remaining scanning procedure may be the same as that of a regular Probe Request.

If the number of different parameters is not greater than K, then the STA may generate a simplified probe request using the format described herein with a difference description field.

Upon receiving a simplified Probe Request frame, the AP may use the reference field or IE in the simplified Probe Request frame to retrieve the information of the earlier received reference Probe Request frame and combine that with the difference description field to re-construct the complete parameters for the simplified Probe Request. The remaining scanning procedure may be the same as that of a regular Probe Request.

Figure 15:
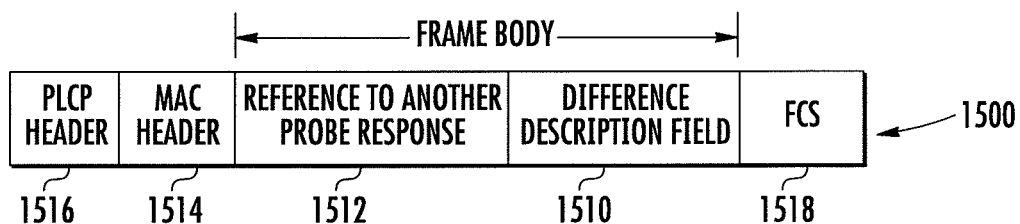
FIG. 15 shows an example of a simplified probe response frame with a difference description field.
Figure 16:
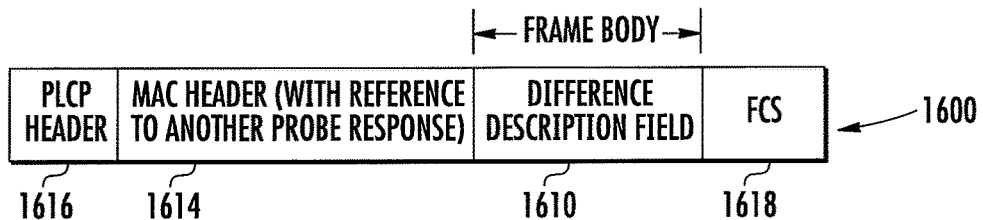
FIG. 16 shows an example of a simplified probe response frame with a difference description field.

Most of a portion of the scanning parameters of a pending probe response may be the same as those an earlier received probe response. However, some parameters may be different. In order to allow more frequent utilization of the simplified Probe Response frames 1500, 1600 (shown in FIGS. 15 and 16) to reduce overhead, a difference description field 1510, 1610 or IE may be used in the simplified Probe Response frame 1500, 1600 to indicate the difference in parameters between the earlier received probe response and the simplified probe response.

Two alternatives are described herein to indicate the difference between an earlier received Probe Response and a Probe Response to be transmitted in the simplified Probe Request frame. The frames 1500, 1600 may both contain references to another probe response. In the frame 1500, the reference is in its own field 1512 and in the frame 1600, the reference is in the MAC header 1614. Note that in both frames 1500 and 1600 contain PLCP headers 1516, 1616 and FCS fields 1518, 1618.

Figure 17:
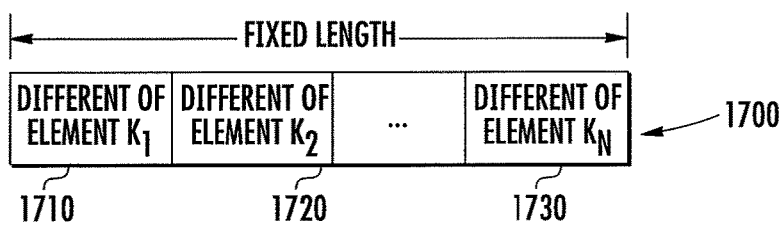
FIG. 17 shows a difference field/IE in simplified probe response frame.

In a first response approach, shown in FIG. 17, the difference description field in the simplified Probe Response frame 1700 includes a fixed number of sub-fields 1710, 1720, 1730 or IEs each describing the difference of a predefined element in the Probe Response 1700. Each sub-field or IE may not include an Element ID since the sequence and meaning of each sub-field or IE is pre-determined. One sub-field is the TSF value or timestamp value, which may be the difference or delta between the current TSF value and TSF value in an earlier Probe Response (that is, TSFcurrent−TSFearlier) or the current TSF.

If the STA may only keep the earlier received probe response up to a maximum time duration of Tmax microseconds, then the sub-field of delta TSF value will have the length of $\lfloor \log_2 T_{max} \rfloor$ bits or $$\left\lfloor \frac{\log_2 T_{max}}{8} \right\rfloor$$

octets.

Figure 18:
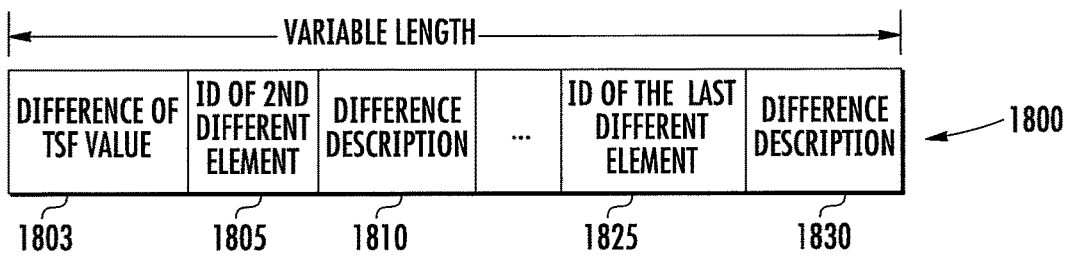
FIG. 18 shows a difference field/IE in simplified probe response frame.

In a second response approach, shown in FIG. 18, the difference description field in a simplified Probe Response frame 1800 includes a sub-field of differential TSF value or timestamp value 1803 followed by a variable number of sub-fields or IEs each containing an Element ID 1805, 1825 and description 1810, 1830 of the difference of the corresponding element (identified by the Element ID) in the Probe Response 1800. The length of difference description field 1810, 1830 or IE of a particular element is pre-determined (has a one-to-one mapping with the corresponding Element ID). The length of the differential TSF value sub-field 1803 may be the same as that used in the first approach.

If an AP has transmitted a Probe Response within the last N ms and the AP has a pending probe response to be transmitted to a STA, the AP may compare the parameters in the earlier transmitted Probe Response with the parameters it wants to transmit in the pending Probe Response. The value of N is a parameter which may be equal to the time that the scanning STA has been listening to channel. The value of N may be represented by: ProbeDelay+time elapsed since the Probe Request corresponding to the Probe Response of interest was received at the AP+a margin.

If the number of different parameters is greater than K, then the AP may transmit a regular Probe Response frame to the STA. The remaining scanning procedure may be the same as that of a regular Probe Response.

If the number of different parameters is not greater than K, then the AP may generate a simplified probe response using the format described herein with a difference description field as described herein.

Upon receiving a simplified Probe Response frame, the STA may use the reference field or IE in the simplified Probe Response frame to retrieve the information of the earlier received reference Probe Response frame and combine it with the difference description field to re-construct the complete parameters for the simplified Probe Response. The remaining scanning procedure may be the same as that of a regular Probe Response.

The simplified Probe Response frame may also be used for OBSS. When a first AP in an OBSS sends a regular Probe Response, a second AP may overhear the regular Probe Response sent by the first AP and transmits a simplified Probe Response to another STA or a broadcast address. The simplified Probe Response may reference the earlier probe response sent by the first AR The simplified Probe Response may include a Probe Response Reference field or IE.

BSSID (or MAC address) of the AP that sent the reference Probe Response and/or a sequence control number of the reference Probe Response may be used to identify the reference Probe Response:

During the waiting time period for an AP to transmit a Probe Response, the AP may check if it has overheard another Probe Response by another AP within the last N ms. N is a parameter which may be equal to the time that the scanning STA has been listening to channel. The value of N may be equal to ProbeDelay+time elapsed since the Probe Request corresponding to the Probe Response of interest was received at the AP+a margin.

If the AP has not overheard another Probe Response, the AP may proceed to transmit a regular Probe Response frame to the STA. The remaining scanning procedure may be the same as that of a regular Probe Response. If the AP has overheard another Probe Response, the AP may compare the parameters in the earlier overheard Probe Response with the parameters it seeks to transmit in the pending Probe Response. If the number of different parameters is greater than K, then the AP may proceed to transmit a regular Probe Response frame to the STA. The remaining scanning procedure may be the same as that of a regular Probe Response.

If the number of different parameters is not greater than K, then the AP may generate a simplified probe response using the format described herein with a difference description field as described herein. Upon receiving a simplified Probe Response frame, the STA may use the reference field or IE (BSSID/MAC address of the AP that sent the reference Probe Response and/or Sequence control number of the reference Probe Response) in the simplified Probe Response frame to retrieve the information of the earlier received reference Probe Response frame and combine that with the difference description field to re-construct the complete parameters for the simplified Probe Response. The remaining scanning procedure may be the same as that of a regular Probe Response.

In a recovery scheme for a simplified probe response, a STA may not understand the simplified probe response it receives from an AP. Upon receiving a Probe Request from a scanning STA, an AP may send a simplified Probe Response to respond when conditions of using simplified Probe Response as described herein are met. After transmission of the simplified Probe Response, the AP starts a timer, referred to herein as an "ACK timer." If the AP does not receive an ACK from the scanning STA by the time the ACK timer reaches a predefined value (which may be based on SIFS or time duration of an ACK or short ACK, for example, SIFS duration+time duration of an ACK or a short ACK), the AP may regard that the simplified Probe Response is not understood by the scanning STA, for example, due to the fact that the reference Probe Response was not received by the STA. The AP may then transmit a regular Probe Response to the scanning STA to recover it from the error case.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method for use in a first station (STA) for fast initial link setup (FILS), the method comprising:
    receiving a frame from an access point (AP), the frame comprising an information element, wherein the information element includes access information comprising at least one identifier (ID) corresponding to at least one STA that is allowed to conduct a FILS procedure with the AP and an indication of a specific time interval for conducting the FILS procedure during which the at least one STA is allowed to associate with the AP using one or more FILS frames; and
    conducting the FILS procedure, including transmitting an association request message to the AP, during the indicated specific time interval;
    wherein the at least one ID of the at least one STA matches a medium access control (MAC) address of the first STA.

2. The method of claim 1, wherein the frame is a beacon frame.

3. The method of claim 1, wherein the frame is a probe response frame.

4. The method of claim 1, wherein the information element further includes priority information for at least one STA.

5. The method of claim 1, wherein conducting the FILS procedure comprises transmitting an authentication frame to the AP.

6. The method of claim 1, wherein conducting the FILS procedure comprises transmitting a probe request frame to the AP.

7. A first station (STA) configured to perform fast initial link setup (FILS), the first STA comprising:
    a transmitter;
    a receiver configured to receive a frame from an access point (AP) comprising an information element, wherein the information element includes access information comprising at least one identifier (ID) corresponding to at least one STA that is allowed to conduct a FILS procedure with the AP and an indication of a specific time interval for conducting the FILS procedure during which the at least one STA is allowed to associate with the AP using one or more FILS frames; and
    a processor configured to determine if at least one ID of the at least one STA matches a medium access control (MAC) address of the first STA; and
    the processor further configured to conduct the FILS procedure, including transmitting an association request message to the AP, during the indicated specific time interval on a condition that the at least one ID of the at least one STA matches the medium access control (MAC) address of the first STA.

8. The first STA of claim 7, wherein the frame is a beacon frame.

9. The first STA of claim 7, wherein the frame is a probe response frame.

10. The first STA of claim 7, wherein the information element further includes priority information for at least one STA.

11. The first STA of claim 7, wherein the transmitter is configured to transmit an authentication frame to the AP, in accordance with the FILS procedure.

12. The first STA of claim 7, wherein the transmitter is configured to transmit a probe request frame to the AP, in accordance with the FILS procedure.

13. A method for use in an access point (AP) for fast initial link setup (FILS), the method comprising:
    transmitting a frame to a first station (STA), the frame comprising an information element, wherein the information element includes access information comprising at least one identifier (ID) corresponding to at least one STA that is allowed to conduct a FILS procedure with the AP and an indication of a specific time interval for conducting the FILS procedure during which the at least one STA is allowed to associate with the AP using one or more FILS frames; and
    receiving at least one FILS frame, including an association request frame, from the first STA during the indicated specific time interval;
    wherein the at least one ID of the at least one STA matches a medium access control (MAC) address of the first STA.

14. The method of claim 13, wherein the frame is a beacon frame.

15. The method of claim 13, wherein the frame is a probe response frame.

16. The method of claim 13, wherein the information element further includes priority information for at least one STA.

17. The method of claim 13, wherein the at least one FILS frame received from the first STA during the indicated specific time interval includes an authentication frame.

18. The method of claim 13, wherein the at least one FILS frame received from the first STA during the indicated specific time interval includes a probe request frame.

19. An access point (AP) configured to perform fast initial link setup (FILS), the AP comprising:

a transmitter configured to transmit a frame to a first station (STA), the frame comprising an information element, wherein the information element includes access information comprising at least one identifier (ID) corresponding to at least one STA that is allowed to conduct a FILS procedure with the AP and an indication of a specific time interval for conducting the FILS procedure during which the at least one STA is allowed to associate with the AP using one or more FILS frames; and a receiver configured to receive at least one FILS frame, including an association request frame, from the first STA during the indicated specific time interval, on a condition that the at least one ID of the at least one STA matches a medium access control (MAC) address of the first STA.

20. The AP of claim 19, wherein the frame is a beacon frame.

21. The AP of claim 19, wherein the frame is a probe response frame.

22. The AP of claim 19, wherein the information element further includes priority information for at least one STA.

23. The AP of claim 19, wherein the at least one FILS frame received from the first STA during the indicated specific time interval includes an authentication frame.

24. The AP of claim 19, wherein the at least one FILS frame received from the first STA during the indicated specific time interval includes a probe request frame.

* * * * *